(12) United States Patent
Fujii et al.

(10) Patent No.: US 8,305,483 B2
(45) Date of Patent: Nov. 6, 2012

(54) IMAGING DEVICE AND FOCUS DETECTING METHOD

(75) Inventors: Shinichi Fujii, Osaka (JP); Kazuhito Shimoda, Kyoto (JP); Yasutoshi Katsuda, Osaka (JP); Hiroki Ui, Tokyo (JP); Yutaka Nishimura, Kanagawa (JP)

(73) Assignee: Sony Corporation, Tokyo (JP)

( * ) Notice: Subject to any disclaimer, the term of this patent is extended or adjusted under 35 U.S.C. 154(b) by 318 days.

(21) Appl. No.: 12/661,736

(22) Filed: Mar. 23, 2010

(65) Prior Publication Data

US 2010/0245656 A1 Sep. 30, 2010

(30) Foreign Application Priority Data

Mar. 31, 2009 (JP) ................................ P2009-084636

(51) Int. Cl.
*H04N 5/232* (2006.01)
(52) U.S. Cl. ........................................................ 348/345
(58) Field of Classification Search .................. 348/273, 348/275, 276, 335, 340, 345, 348, 349, 350, 348/353–356, 374; 396/79, 80, 111, 114, 396/115, 121, 124
See application file for complete search history.

(56) References Cited

U.S. PATENT DOCUMENTS

| | | | | |
|---|---|---|---|---|
| 6,819,360 B1* | 11/2004 | Ide et al. | ........................ | 348/340 |
| 7,488,923 B2* | 2/2009 | Kusaka | ........................ | 250/201.2 |
| 7,522,341 B2* | 4/2009 | Mouli | ............................ | 359/619 |
| 7,586,072 B2* | 9/2009 | Kusaka | ........................ | 250/201.2 |
| 7,586,588 B2* | 9/2009 | Kusaka | ............................. | 356/30 |
| 7,711,261 B2* | 5/2010 | Kusaka | ............................ | 396/111 |
| 7,715,703 B2* | 5/2010 | Utagawa et al. | ............... | 396/111 |
| 7,751,700 B2* | 7/2010 | Kusaka | .............................. | 396/79 |
| 7,783,185 B2* | 8/2010 | Kusaka | ............................ | 396/111 |
| 7,792,420 B2* | 9/2010 | Kusaka | .............................. | 396/79 |
| 7,812,881 B2* | 10/2010 | Kusaka | ............................ | 348/350 |
| 7,822,333 B2* | 10/2010 | Kusaka | .............................. | 396/80 |
| 7,863,550 B2* | 1/2011 | Kusaka | ........................ | 250/201.8 |
| 7,873,267 B2* | 1/2011 | Kusaka | ............................ | 396/104 |
| 7,978,255 B2* | 7/2011 | Suzuki | ............................ | 348/350 |
| 8,072,529 B2* | 12/2011 | Murakami | .................... | 348/335 |
| 8,098,321 B2* | 1/2012 | Shimoda et al. | ............... | 348/349 |
| 8,149,324 B2* | 4/2012 | Oikawa | ........................ | 348/349 |
| 2002/0121652 A1* | 9/2002 | Yamasaki | ..................... | 348/308 |
| 2002/0122124 A1* | 9/2002 | Suda | .............................. | 348/263 |

(Continued)

FOREIGN PATENT DOCUMENTS

JP 2001-250931 A 9/2001

(Continued)

*Primary Examiner* — Aung S Moe
(74) *Attorney, Agent, or Firm* — Lerner, David, Littenberg, Krumholz & Mentlik, LLP

(57) ABSTRACT

An imaging device includes an image pickup device having an arrangement of photoelectric converting units, the arrangement in which a plurality of pairs of photoelectric converting units are arranged along a predetermined direction, each pair of photoelectric converting units receiving light beams of a subject passing through partial areas in a pair that are lopsided in reverse to each other along the predetermined direction in an exit pupil of a shooting optical system, and a focus detector for performing focus detection of a phase-difference detecting technique according to data obtained from the pair of photoelectric converting units in the arrangement of the photoelectric converting units. The focus detector corrects the data according to a correction amount corresponding to a positional shift amount from the normalized position, and performs focus detection of the phase-difference detecting technique according to the corrected data.

6 Claims, 15 Drawing Sheets

U.S. PATENT DOCUMENTS

| | | | |
|---|---|---|---|
| 2006/0001765 A1* | 1/2006 | Suda | 348/362 |
| 2006/0092313 A1* | 5/2006 | Kimura | 348/345 |
| 2007/0102619 A1* | 5/2007 | Kusaka | 250/201.2 |
| 2008/0112643 A1* | 5/2008 | Kusaka | 396/128 |
| 2008/0283724 A1* | 11/2008 | Goto | 250/201.6 |
| 2010/0176273 A1* | 7/2010 | Shimoda et al. | 250/208.1 |
| 2010/0302433 A1* | 12/2010 | Egawa | 348/345 |
| 2011/0164166 A1* | 7/2011 | Oikawa | 348/340 |
| 2011/0164169 A1* | 7/2011 | Yamasaki | 348/345 |
| 2011/0205388 A1* | 8/2011 | Iwane | 348/222.1 |
| 2011/0273581 A1* | 11/2011 | Fujii et al. | 348/222.1 |
| 2011/0285899 A1* | 11/2011 | Hirose | 348/360 |
| 2012/0033128 A1* | 2/2012 | Nagano | 348/349 |
| 2012/0062786 A1* | 3/2012 | Hamano | 348/345 |
| 2012/0176520 A1* | 7/2012 | Hara | 348/246 |

FOREIGN PATENT DOCUMENTS

JP          2005-303409 A          10/2005

* cited by examiner

PIXEL POSITION

PIXEL POSITION

IMAGING DEVICE AND FOCUS DETECTING METHOD

CROSS-REFERENCE TO RELATED APPLICATION

The present application claims priority from Japanese Patent Application No. JP 2009-084636 filed in the Japanese Patent Office on Mar. 31, 2009, the entire content of which is incorporated herein by reference.

BACKGROUND OF THE INVENTION

1. Field of the Invention

The present invention relates to a technology for an imaging device capable of focus detection by a phase difference detecting technique.

2. Description of the Related Art

In an imaging device, such as a digital single-lens reflex camera, focus detection has been suggested using a phase-difference detection technique with an image pickup device (also referred to below as an image pickup device provided with a phase-difference detecting function) with a plurality of pairs of photoelectric converting units (photo diodes), each pair receiving a subject light beam through a pair of partial regions of an exit pupil (for example, right and left pupil portions) to generate an electric charge signal. Examples of this image pickup device are as follows.

For example, Japanese Unexamined Patent Application Publication No. 2001-250931 discloses an image pickup device with a phase-difference detection function, the image pickup device configured to have a two-way split photoelectric converting unit (referred to below as a half-sized photoelectric converting unit) in each normal pixel (each of R, G, and B pixels) for obtaining an image signal of a subject, that is, the image pickup device in which a pair of half-sized photoelectric converting units is disposed on a lower portion of one microlens.

Also, for example, Japanese Unexamined Patent Application Publication No. 2005-303409 discloses an image pickup device with a phase-difference detection function, the image pickup device in which a pair of photoelectric converting units receives light from a pair of partial regions of the exit pupil by restricting subject light beams at a pair of adjacent pixels by an opening formed at a light-shielding mask using a metal layer.

SUMMARY OF THE INVENTION

In the image pickup devices with a phase-difference detection function disclosed in Japanese Unexamined Patent Application Publications Nos. 2001-250931 and 2005-303409, a positional shift may occur between the pair of photoelectric converting units and the microlens or the opening of the light-shielding mask due to an error in a manufacturing process. With the occurrence of this positional shift, an imbalance may occur to an electric charge signal generated at the pair of photoelectric converting units, thereby making it difficult to perform accurate focus detection by a phase-difference detection technique.

It is desirable to provide a technique for an imaging device capable of an accurate focus detection in a phase-difference detection technique even when a positional shift occurs in an image pickup device with a phase-detection function due to a manufacturing error.

An imaging device according to an embodiment of the present invention includes an image pickup device having an arrangement of photoelectric converting units, the arrangement in which a plurality of pairs of photoelectric converting units are arranged along a predetermined direction, each pair of photoelectric converting units receiving light beams of a subject passing through partial areas in a pair that are lopsided in reverse to each other along the predetermined direction in an exit pupil of a shooting optical system, and focus detecting means for performing focus detection of a phase-difference detecting technique according to data obtained from the pair of photoelectric converting units in the arrangement of the photoelectric converting units. Due to an error in manufacturing the image pickup device, a relative positional shift occurs from a normalized position where the light beams of the subject are received by the pair of photoelectric converting units with a predetermined light-receiving balance. The focus detecting means includes correcting means for correcting the data according to a correction amount corresponding to a positional shift amount from the normalized position, and means for performing focus detection of the phase-difference detecting technique according to the data corrected by the correcting means.

A focus detecting method according to another embodiment of the present invention includes the steps of exposing an image pickup device having an arrangement of photoelectric converting units, the arrangement in which a plurality of pairs of photoelectric converting units are arranged along a predetermined direction, each pair of photoelectric converting units receiving light beams of a subject passing through partial areas in a pair that are lopsided in reverse to each other along the predetermined direction in an exit pupil of a shooting optical system, and performing focus detection of a phase-difference detecting technique according to data obtained from the pair of photoelectric converting units after the exposure at the exposing step in the arrangement of the photoelectric converting units. Due to an error in manufacturing the image pickup device, a relative positional shift occurs from a normalized position where the light beams of the subject are received by the pair of photoelectric converting units with a predetermined light-receiving balance. The focus detecting step includes the steps of correcting the data according to a correction amount corresponding to a positional shift amount from the normalized position, and performing focus detection of the phase-difference detecting technique according to the data corrected in the correcting step.

According to the embodiments of the present invention, due to an error in manufacturing an image pickup device having an arrangement of photoelectric converting units, the arrangement in which a plurality of pairs of photoelectric converting units are arranged along a predetermined direction, each pair of photoelectric converting units receiving light beams of a subject passing through partial areas in a pair that are lopsided in reverse to each other along the predetermined direction in an exit pupil of a shooting optical system, a relative positional shift occurs from a normalized position where the light beams of the subject are received by the pair of photoelectric converting units with a predetermined light-receiving balance. The data obtained from the pair of photoelectric converting units in the arrangement of the photoelectric converting units is corrected with a correction amount corresponding to a positional shift amount from the normalized position, and focus detection of the phase-difference detecting technique is performed based on the corrected data. As a result, even when a positional shift occurs due to an error of manufacturing in the image pickup device, focus detection of the phase-difference detecting technique can be accurately performed.

DESCRIPTION OF THE PREFERRED EMBODIMENTS

Embodiments

[Main Structure of the Imaging Device]

Figure 1:
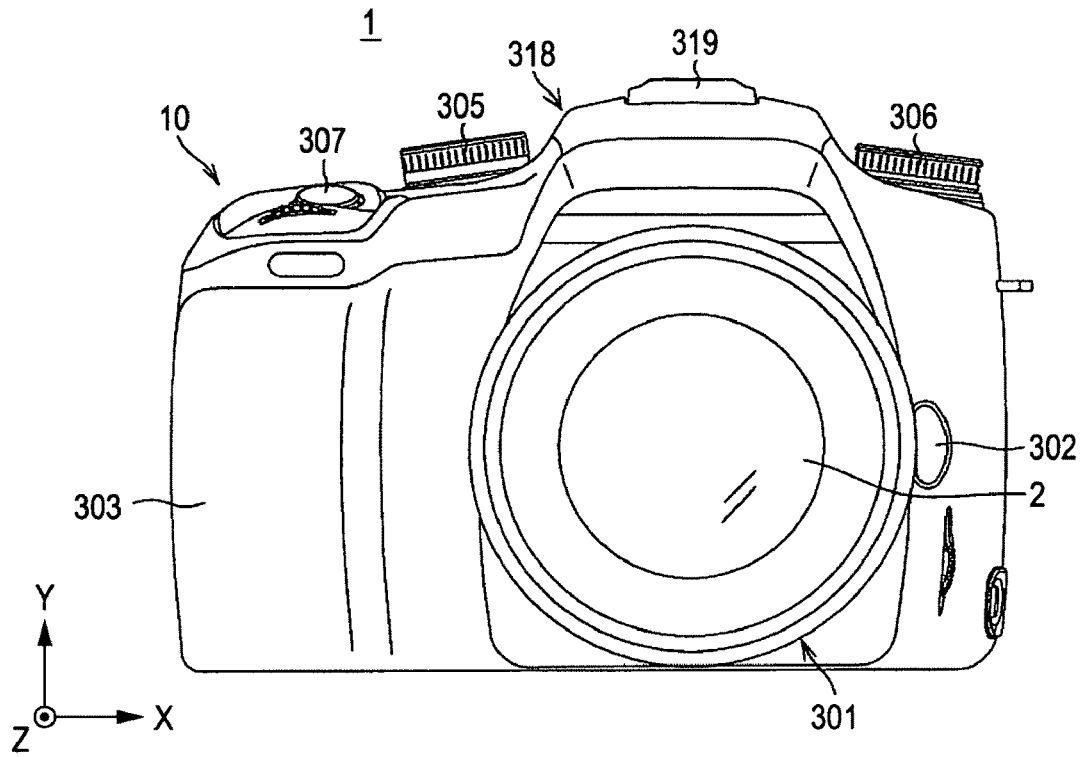
FIG. 1 shows the external structure of an imaging device according to an embodiment of the present invention.
Figure 2:
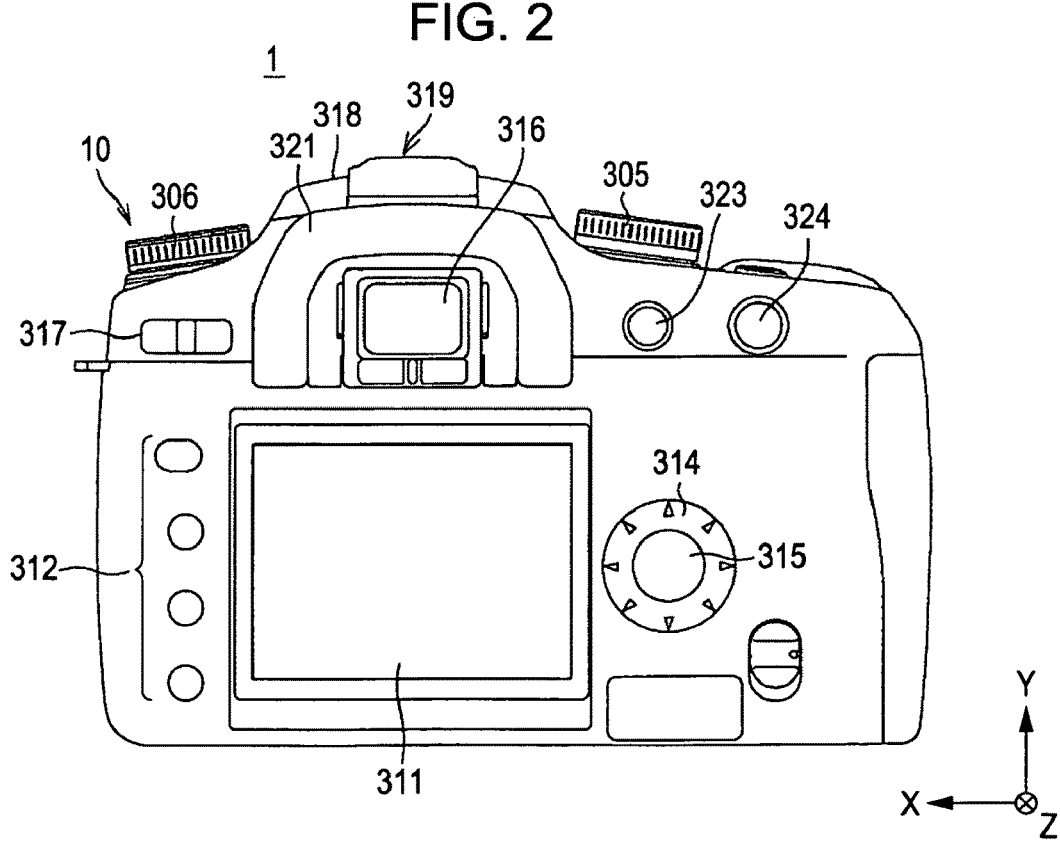
FIG. 2 shows the external structure of the imaging device.

FIGS. 1 and 2 are diagrams depicting an external structure of an imaging device 1 according to an embodiment of the present invention. Here, FIG. 1 is a front view, and FIG. 2 is a rear view.

The imaging device 1 is configured as, for example, a digital still camera of a single-lens reflex type, and includes a camera body 10 and an interchangeable lens 2 as a taking lens removably attached to the camera body 10.

In FIG. 1, the camera body 10 has provided on its front side a mount unit 301 to which the interchangeable lens 2 is to be mounted approximately at the front center, a lens change button 302 disposed on a right side of the mount unit 301, a grip unit 303 for allowing a grip, a mode setting dial 305 disposed on an upper-left portion at front, a control-value setting dial 306 disposed on an upper-right portion at front, and a shutter button 307 disposed on an upper surface of the grip unit 303.

In FIG. 2, the camera body 10 has provided on its rear side an LCD (liquid crystal display) 311, a setting button group 312 disposed on the left of the LCD 311, a cross key 314 disposed on the right of the LCD 311, and a push button 315 disposed at the center of the cross key 314. Also, the camera body 10 has provided on its rear side an EVF (electronic view finder) 316 disposed above the LCD 311, an eye cup 321 surrounding the EVF 316, a main switch 317 disposed on the left of the EVF 316, an exposure correction button 323 and an AE lock button 324 disposed on the right of the EVF 316, and a flash unit 318 and a connection terminal unit 319 disposed above the EVF 316.

The mount unit 301 is provided with a connector Ec (refer to FIG. 4) for electric connection and a coupler 75 (refer to FIG. 4) for mechanical connection with the mounted interchangeable lens 2.

The lens change button 302 is a button to be pressed when the interchangeable lens 2 mounted on the mount unit 301 is removed.

The grip unit 303 is a portion of the imaging device 1 to be gripped by a user at the time of shooting, and is provided with asperities on the surface that fit a finger shape so as to improve fittability. The grip unit 303 has provided therein a battery storage space and a card storage space (not shown). In the battery storage space, a battery 69B (refer to FIG. 4) is stored as a power supply for the camera. In the card storage space, a memory card 67 (refer to FIG. 4) for recording image data of shot images is removably stored. The grip unit 303 may be provided with a grip sensor for detecting whether the user grips the grip unit 303.

The mode setting dial 305 and the control-value setting dial 306 are each made of a member in an approximately disk shape rotatable in a plane approximately parallel to an upper surface of the camera body 10. The mode setting dial 305 is to select any one of modes or functions included in the imaging device 1, such as an auto-exposure (AE) control mode, autofocus (AF) control mode, various shooting modes typified by a still-picture shooting mode for shooting a single still picture and a serial shooting mode for serial shooting, and a reproducing mode for reproducing a recorded image. On the other hand, the control-value setting dial 306 is to set control values for various functions included in the imaging device 1.

The shutter button 307 is a press switch allowing an operation in a "halfway-down state" where the button is pressed halfway down and an operation in an "all-the-way-down state" where the button is pressed further down. In a still-picture shooting mode, when the shutter button 307 is pressed halfway down, a preparing operation (such as setting an exposure control value and detecting a focus) is performed for shooting a still picture of a subject. Then, when the shutter button 307 is pressed all the way down, a shooting operation (a series of operation of exposing the image pickup device 101 (refer to FIG. 3), performing a predetermined image process on an image signal obtained through exposure, and recording the process result on a memory card or the like) is performed.

The LCD 311 includes a color liquid crystal panel capable of image display for displaying an image shot by an image pickup device 101 (refer to FIG. 3) and reproducing and displaying a recorded image, and also displaying a screen for setting a function or mode included in the imaging device 1. In place of the LCD 311, an organic EL or a plasma display device may be used.

The setting button group 312 has buttons for operations of various functions included in the imaging device 1, the buttons including, for example, a selection confirmation switch for confirming a selection on a menu screen displayed on the LCD 311, a selection cancel switch, a menu display switch for switching details of the menu screen, a display ON/OFF switch, and a display enlarging switch.

The cross key 314 has a ring-shaped member with a plurality of pressing units (portions marked with triangles in FIG. 2) disposed a predetermined space apart from each other in a circumferential direction, and is configured so that a pressing operation of each pressing unit is detected by a contact (switch), although not shown, provided correspondingly to each pressing unit. The push button 315 is disposed at the center of the cross key 314. The cross key 314 and the push button 315 are to change a shooting magnification (move a zoom lens 212 (refer to FIG. 4) in a wide or tele direction), advance recorded images frame by frame for reproduction on the LCD 311 or the like, and input an instruction, such as an instruction for setting a shooting condition (such as an f-number, shutter speed, and whether to fire a flash of light).

The EVF 316 includes a liquid crystal panel 310 (refer to FIG. 3), displaying an image captured by the image pickup device 101 (refer to FIG. 3) and reproducing and displaying a recorded image, for example. In these EVF 316 and the LCD 311, a live view (preview) display is performed in which a subject is displayed in a motion-picture mode according to image signals sequentially generated by the image pickup device 101 before a main shooting (shooting for image recording). This allows the user to view the image of the subject actually shot by the image pickup device 101.

The main switch 317 is a slide switch with two contacts sliding horizontally, powering on the imaging device 1 when being set to left and powering off the imaging device 1 when being set to right.

The flash unit 318 is configured as a built-in flash of a pop-up type. If an external flash or the like is mounted on the camera body 10, a connection terminal unit 319 is used for connection.

The eye cup 321 is a light-shielding member in a C shape to suppress intrusion of external light into the EVF 316.

The exposure correction button 323 is a button for manually adjusting an exposure value (f-number or shutter speed). The AE lock button 324 is a button for fixing exposure.

The interchangeable lens 2 functions as a lens window for capturing light (optical image) from the subject, and also functions as a shooting optical system for guiding the subject light into the image pickup device 101 disposed inside of the camera body 10. This interchangeable lens 2 can be removed from the camera body 10 by pressing the lens change button 302 described above.

Figure 3:
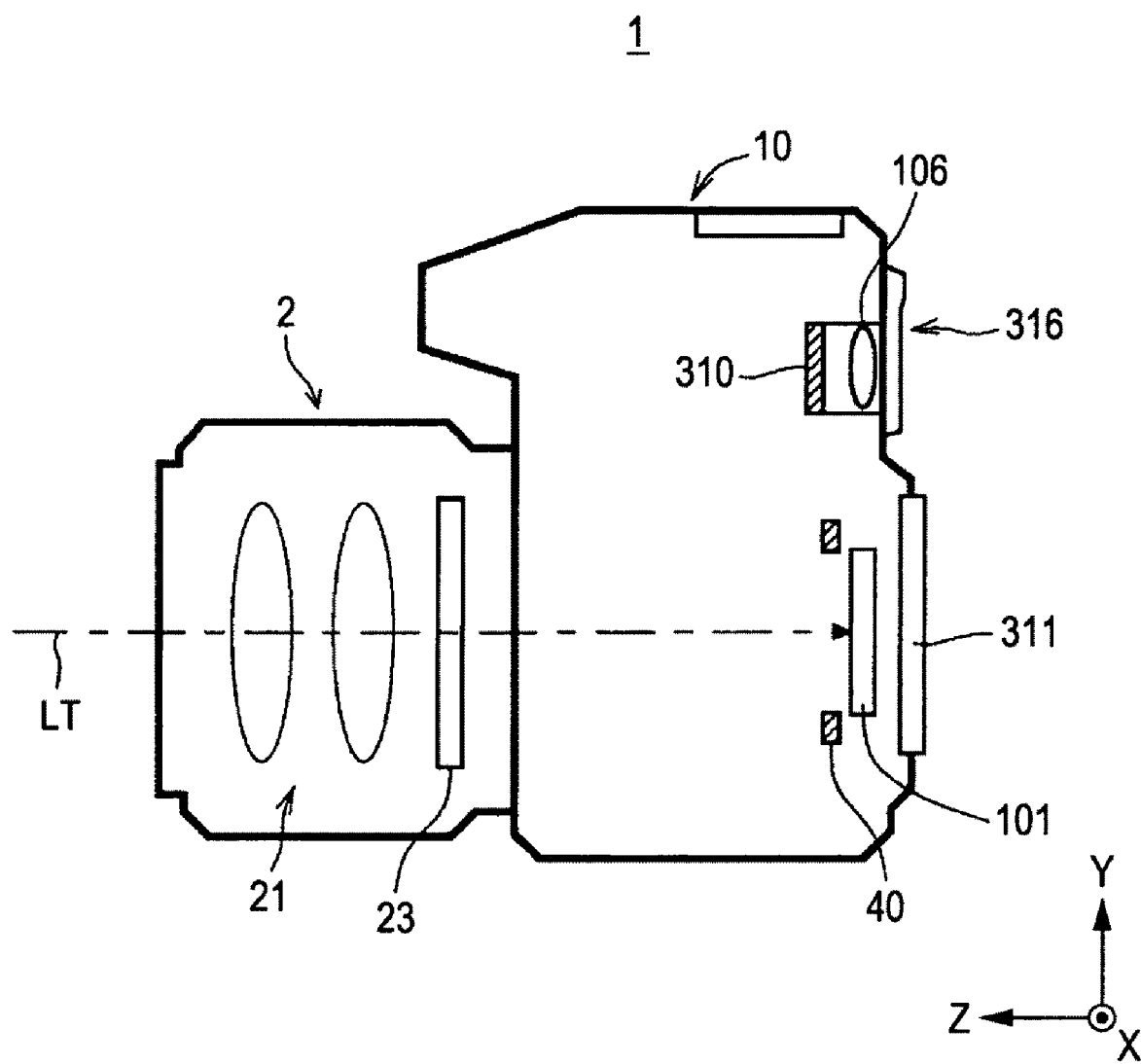
FIG. 3 is a longitudinal sectional view of the imaging device.
Figure 4:
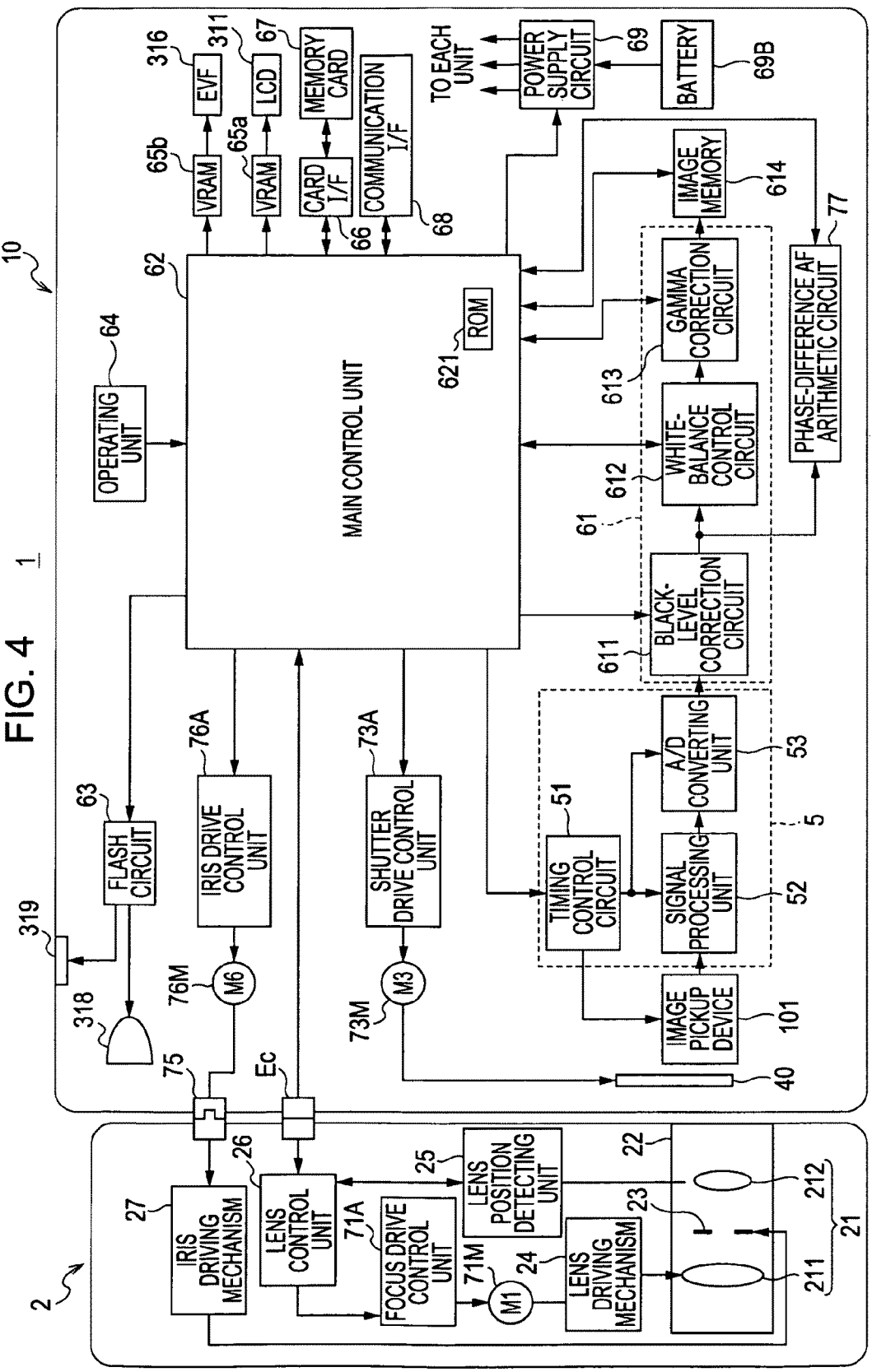
FIG. 4 is a block diagram depicting an electrical structure of the imaging device.

The interchangeable lens 2 includes a lens group 21 of a plurality of lenses disposed in series along an optical axis LT (refer to FIG. 4). This lens group 21 includes a focus lens 211 (refer to FIG. 4) for adjusting a focus and the zoom lens 212 (refer to FIG. 4) for enlargement and reduction. With the focus lens 211 driven in an optical axis direction indicated by the line LT in FIG. 3, focus adjustment is performed. With the zoom lens 212 driven in the optical axis direction indicated by the line LT in FIG. 3, enlargement or reduction is performed. The interchangeable lens 2 has an appropriate circumferential portion of its barrel provided with an operation ring rotatable along a circumferential surface of the barrel. The zoom lens 212 moves in an optical axis direction according to the rotating direction and amount of the operation ring through a manual or automated operation, thereby setting a zoom magnification (shooting magnification) according to the position of the movement destination.

[Internal Structure of the Imaging Device 1]

Next, the internal structure of the imaging device 1 is described. FIG. 3 is a longitudinal sectional view of the imaging device 1. As depicted in FIG. 3, the camera body 10 is provided therein with the image pickup device 101, the EVF 316, and others.

The image pickup device 101 is disposed on the optical axis LT of the lens group included in the interchangeable lens 2 when mounted on the camera body 10, in a direction perpendicular to the optical axis LT. As the image pickup device 101, for example, a CMOS color area sensor (CMOS-Type Image Pickup Device)

is used, in which a plurality of pixels configured to have photodiodes are two-dimensionally disposed in a matrix shape. The image pickup device 101 generates analog electric signals (image signals) of R (red), G (green), and B (blue) color components for light beams of the subject received through the interchangeable lens 2, and outputs them as image signals of R, G, and B colors. The structure of the image pickup device 101 will be described further below in detail.

The image pickup device 101 is two-dimensionally held in a plane orthogonal to the optical axis LT. At front in the optical axis direction of the image pickup device 101, a shutter unit 40 is disposed. This shutter unit 40 includes a screen member moving in a vertical direction. The shutter unit 40 is configured as a mechanical focal plane shutter that performs an operation of opening and interrupting an optical path for the subject light guided along the optical axis LT to the image pickup device 101 by opening and closing the screen member. The shutter unit 40 can be omitted when the image pickup device 101 can serve as a complete electronic shutter.

The EVF 316 includes the liquid crystal panel 310 and an ocular lens 106. The liquid crystal panel 310 is configured as, for example, a color liquid crystal panel capable of image display, allowing an image captured by the image pickup device 101 to be displayed. The ocular lens 106 guides a subject image displayed on the liquid crystal panel 310 to the outside. With this configuration of the EVF 316, the user can view the image of the subject shot by the image pickup device 101.

[Electrical Structure of the Imaging Device 1]

FIG. 4 is a block diagram depicting an electrical structure of the imaging device 1. Here, members identical to those in FIGS. 1 to 3 are provided with the same reference numerals. For convenience of description, the electrical structure of the interchangeable lens 2 is first described.

The interchangeable lens 2 includes, in addition to the lens group 21 configuring the shooting optical system described above, a lens driving mechanism 24, a lens position detecting unit 25, a lens control unit 26, and an iris driving mechanism 27.

In the lens group 21, the focus lens 211 and the zoom lens 212 and an iris 23 for adjusting a light amount incident to the image pickup device 101 provided in the camera body 10 are held in a barrel 22 in the optical axis direction indicated by the line LT in FIG. 3, capturing an optical image of the subject to form an image at the image pickup device 101. In AF control, the focus lens 211 is driven in the optical axis LT direction by an AF actuator 71M in the interchangeable lens 2, thereby adjusting the focus.

A focus drive control unit 71A generates a drive control signal for the AF actuator 71M to move the focus lens 211 to a focus position, based on an AF control signal given from a main control unit 62 via the lens control unit 26. The AF actuator 71M is a stepping motor or the like to give a lens driving force to the lens driving mechanism 24.

The lens driving mechanism 24 includes, for example, a helicoid and gear (not shown) to rotate the helicoid. Upon reception of a driving force from the AF actuator 71M, the lens driving mechanism 24 drives the focus lens 211 and others in a direction parallel to the optical axis LT. Here, the moving direction and the moving amount of the focus lens 211 are in accordance with the rotating direction and the number of rotations of the AF actuator 71M, respectively.

The lens position detecting unit 25 includes an encode plate in which a plurality of code patterns are formed at a predetermined pitch in the optical axis LT direction within a moving range of the lens group 21, and also includes an encoder blush that moves integrally with the lenses as slidably making contact with this encode plate. The lens position detecting unit 25 detects a moving amount of the lens group 21 at the time of focus adjustment. The lens position detected by the lens position detecting unit 25 is output as the number of pulses, for example.

The lens control unit 26 is, for example, a microcomputer having memories, such as a ROM that stores a control program and other programs, and a flash memory that stores data regarding state information.

The lens control unit 26 also has a communication function of communicating with the main control unit 62 of the camera body 10 via the connector Ec. With this, for example, state information data, such as a focal length of the lens group 21, exit-pupil position, f-number, in-focus distance, and peripheral light amount, and the position information of the focus lens 211 detected by the lens position detecting unit 25 can be transmitted to the main control unit 62. Also, for example, data about the driving amount of the focus lens 211 can be received from the main control unit 62.

The iris driving mechanism 27 changes the iris diameter of the iris 23 by receiving a driving force from an iris drive actuator 76M via the coupler 75.

Next, the electrical structure of the camera body 10 is described. The camera body 10 includes, in addition to the image pickup device 101, the shutter unit 40, and others described above, an analog front end (AFE) 5, an image processing unit 61, an image memory 614, the main control unit 62, a flash circuit 63, an operating unit 64, a VRAM 65 (65a, 65b), a card interface (I/F) 66, the memory card 67, a communication interface (I/F) 68, a power supply circuit 69, the battery 69B, a shutter drive control unit 73A and a shutter drive actuator 73M, an iris drive control unit 76A, and the iris drive actuator 76M.

As described above, the image pickup device 101 is a CMOS color area sensor. By a timing control circuit 51, which will be described further below, capturing operations are controlled, such as starting (ending) an exposing operation of the image pickup device 101, selecting an output of each pixel included in the image pickup device 101, and reading a pixel signal.

An AFE 5 gives the image pickup device 101a timing pulse for a predetermined operation, and also performs a predetermined signal process on an image signal (analog signal group of light received by each pixel of a CMOS area sensor) output from the image pickup device 101 for conversion to a digital signal and output to the image processing unit 61. This AFE 5 includes, for example, the timing control circuit 51, a signal processing unit 52, and an A/D converting unit 53.

The timing control circuit 51 generates a predetermined timing pulse (pulse for generating, for example, a vertical scanning pulse ϕVn, a horizontal scanning pulse ϕVm, and a reset signal ϕVr) according to a reference clock output from the main control unit 62, and outputs the generated timing pulse to the image pickup device 101, thereby controlling a capturing operation of the image pickup device 101. Also, by outputting the predetermined timing pulse to the signal processing unit 52 and the A/D converting unit 53, the timing control circuit 51 controls operations of the signal processing unit 52 and the A/D converting unit 53.

The signal processing unit 52 performs a predetermined analog signal process on an analog image signal output from the image pickup device 101. This signal processing unit 52 includes, for example, a correlated double sampling (CDS) circuit, an auto gain control (AGC) circuit, and a clamp circuit. The A/D converting unit 53 converts analog R, G, and B image signals output from the signal processing unit 52 to digital image signals of a plurality of bits (for example, 12 bits) according to the timing pulse output from the timing control circuit 51.

The image processing unit 61 performs a predetermined signal process on image data output from the AFE 5 to create an image file, and includes, for example, a black-level correction circuit 611, a white-balance control circuit 612, and a gamma correction circuit 613. The image data captured into the image processing unit 61 is once written in the image memory 614 in synchronization with a read by the image pickup device 101. Thereafter, the image data written in this image memory 614 is accessed for processing at each block of the image processing unit 61.

The black-level correction circuit 611 corrects a black level of each of R, G, and B digital image signals obtained through A/D conversion by the A/D converting unit 53 to a reference black level.

The white-balance control circuit 612 converts a level of each of digital signals of R (red), G (green), and B (blue) color components, based on the reference of white according to the light source (white balance (WB) adjustment). That is, the white-balance control circuit 612 determines, based on the WB adjustment data given from the main control unit 62, a portion presumed to be originally white with the luminance, chroma data, and others of the shot image of the subject, finds an average of the respective R, G, and B color components in that portion, a G/R ratio, and a G/B ratio, and performs level correction with these taken as R and B correction gains.

The gamma correction circuit 613 corrects gray-scale characteristics of WB-adjusted image data. Specifically, the gamma correction circuit 613 non-linearly transforms the level of the image data by using a gamma correction table previously set for each color component, and also performs offset adjustment.

The image memory 614 is a memory for use as a working area for temporarily storing image data output from the image processing unit 61 and performing a predetermined process on this image data by the main control unit 62 in a shooting mode. In a reproduction mode, the image memory 614 temporarily stores image data read from the memory card 67.

The main control unit 62 is, for example, a microcomputer having a storage unit that includes a ROM 621 that stores a control program and a RAM that temporarily stores data. The main control unit 62 generally controls the operation of each unit in the imaging device 1. Here, in the ROM of the main control unit 62, information about a correction value β is stored, which will be described further below.

The flash circuit 63 controls a light-emitting amount of the flash unit 318 or an external flash connected to the connection terminal unit 319 to a light-emitting amount set by the main control unit 62, in a flash shooting mode.

The operating unit 64 includes, for example, the mode setting dial 305, the control-value setting dial 306, the shutter button 307, the setting button group 312, the cross key 314, the push button 315, and the main switch 317, and is to input operation information to the main control unit 62.

The VRAM 65a is a buffer memory between the main control unit 62 and the LCD 311, having a storage capacity for image signals corresponding to the number of pixels of the LCD 311. The VRAM 65b is a buffer memory between the main control unit 62 and the EVF 316, having a storage capacity for image signals corresponding to the number of pixels of the EVF 316. The card I/F 66 is an interface for allowing transmission and reception of signals between the memory card 67 and the main control unit 62. The memory card 67 is a recording medium that stores image data generated by the main control unit 62. The communication I/F 68 is an interface for allowing transmission of image data and others to a personal computer and other external equipment.

The power supply circuit 69 is, for example, a constant voltage circuit, and generates a voltage for driving the entire imaging device 1 including control units, such as the main control unit 62, the image pickup device 101, and other various driving units. Energization control over the image pickup device 101 is performed with a control signal given from the main control unit 62 to the power supply circuit 69. The battery 69B is a secondary battery, such as a nickel metal hydride rechargeable battery, or a primary battery, such as an alkaline battery, and is a power supply that supplies electric power to the entire imaging device 1.

The shutter drive control unit 73A generates a drive control signal for the shutter drive actuator 73M according to a control signal given from the main control unit 62. The shutter drive actuator 73M is an actuator that drives the shutter unit 40 open and close.

The iris drive control unit 76A generates a drive control signal for the iris drive actuator 76M according to a control signal given from the main control unit 62. The iris drive actuator 76M gives a driving force to the iris driving mechanism 27 via the coupler 75.

The camera body 10 also includes a phase-difference AF arithmetic circuit 77 that performs an arithmetic (phase-difference AF arithmetic) necessary at the time of auto focus (AF) control using the image pickup device 101, based on black-level-corrected image data output from the black-level correction circuit 611.

Next, a phase-difference AF operation of the imaging device 1 using this phase-difference AF arithmetic circuit 77 is described.

[Phase-Difference AF Operation of the Imaging Device 1]

The imaging device 1 is configured so that the image pickup device 101 receives transmitted light transmitting (passing) through a different portion of the exit pupil, thereby allowing focus detection (phase-difference AF) in a phase-difference detection technique. The structure of the image pickup device 101 and principles of phase-difference AF using the image pickup device 101 are now described below.

Figure 5:
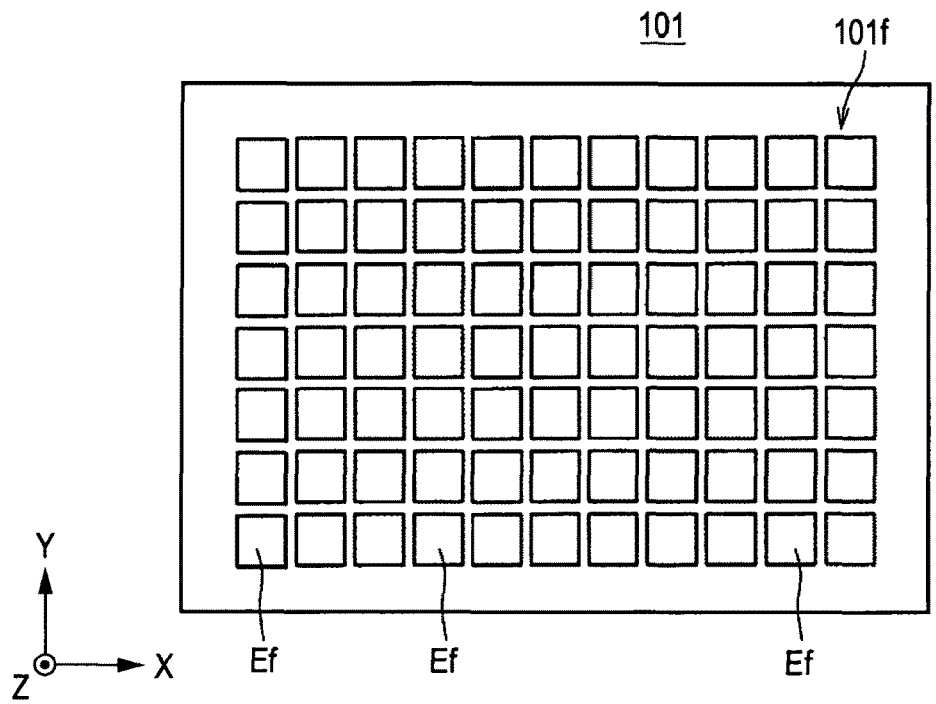
FIG. 5 illustrates the structure of an image pickup device.
Figure 6:
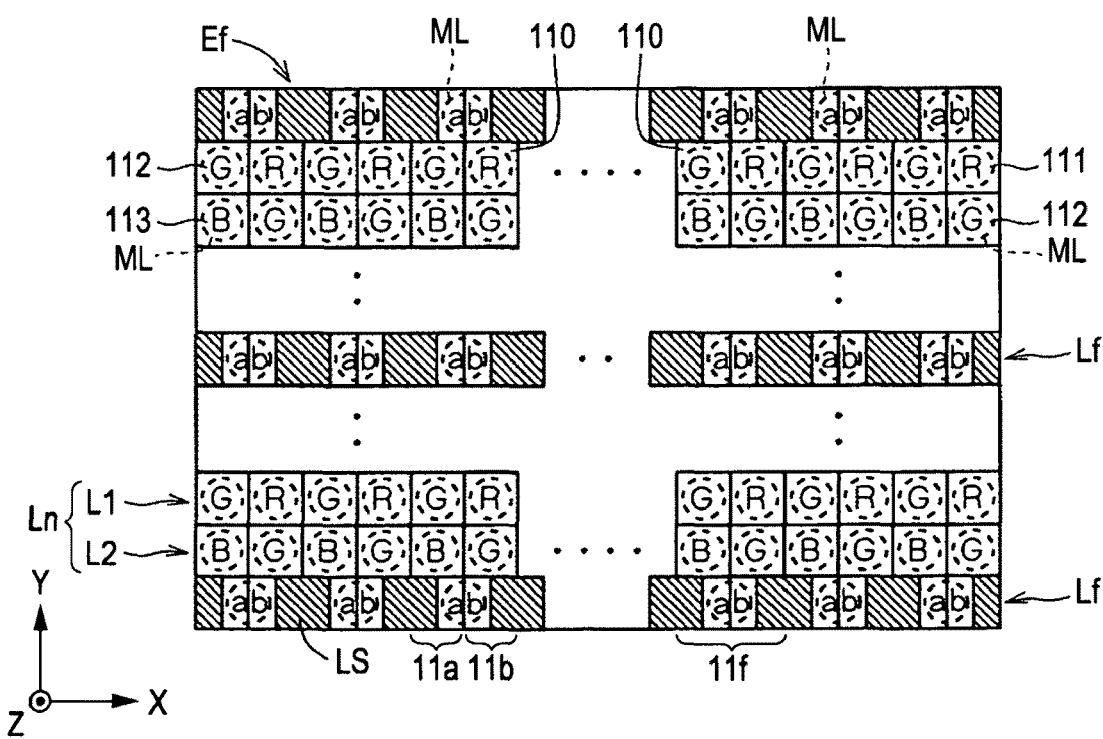
FIG. 6 illustrates the structure of the image pickup device.

FIGS. 5 and 6 illustrate the structure of the image pickup device 101.

The image pickup device 101 is configured to have a plurality of AF areas Ef defined in a matrix in an imaging plane 101f, thereby allowing focus detection of the phase-difference detecting technique at each AF area Ef (FIG. 5).

Each AF area Ef is provided with normal pixels 110 between microlenses ML functioning as light-gathering lenses (indicated by broken-line circles) and photodiodes, the normal pixels 110 formed of R pixels 111 with R (red) color filters, G pixels 112 with G (green) color filters, and B pixels 113 with B (blue) filters. Each AF area Ef is also provided with pixel pairs (also referred to below as AF pixel pairs) 11f achieving an iris dividing function for phase-difference AF (FIG. 6). In this AF area Ef, in principle, image information about the subject is obtained by the normal pixels 110, which have a larger number of pixels than those of the AF pixel pairs 11f.

In the AF area Ef, as horizontal lines (also referred to below as normal-pixel lines) Ln of the normal pixels (second pixels) 110 without the iris dividing function, Gr lines L1 in which the G pixels 112 and the R pixels 111 are alternately disposed in the horizontal direction and Gb lines L2 in which the B pixels 113 and the G pixels 112 are alternately disposed in the horizontal direction are formed. With these Gr line L1 and the Gb line L2 alternately disposed in a vertical direction, Bayer matrix with a group of the normal pixels 110 is configured.

Also, in the AF area Ef, AF lines Lf are cyclically disposed in the vertical direction, the AF lines Lf formed with the AF pixel pairs 11f each including one microlens ML having the same structure (diameter and curvature) as that of the normal pixel 110 being repeatedly arranged adjacently to each other along the horizontal direction. Here, between the AF lines Lf adjacent to each other in the vertical direction, the normal-pixel lines Ln as many as necessary to complement missing image information about the subject on the AF lines Lf (for example, four or more normal-pixel lines Ln) are preferably provided. Here, as a combination of two adjacent normal-pixel lines Ln above and below one AF line Lf, horizontal lines of the same series (Gr lines L1 or Gb lines L2) may be used, or horizontal lines of different series (one is a Gr line L1 and the other is a Gb line L2) may be used.

Next, a difference in structure between the normal pixel 110 and the AF pixel pair 11f is described. First, the structure of the normal pixel 110 is described.

Figure 7:
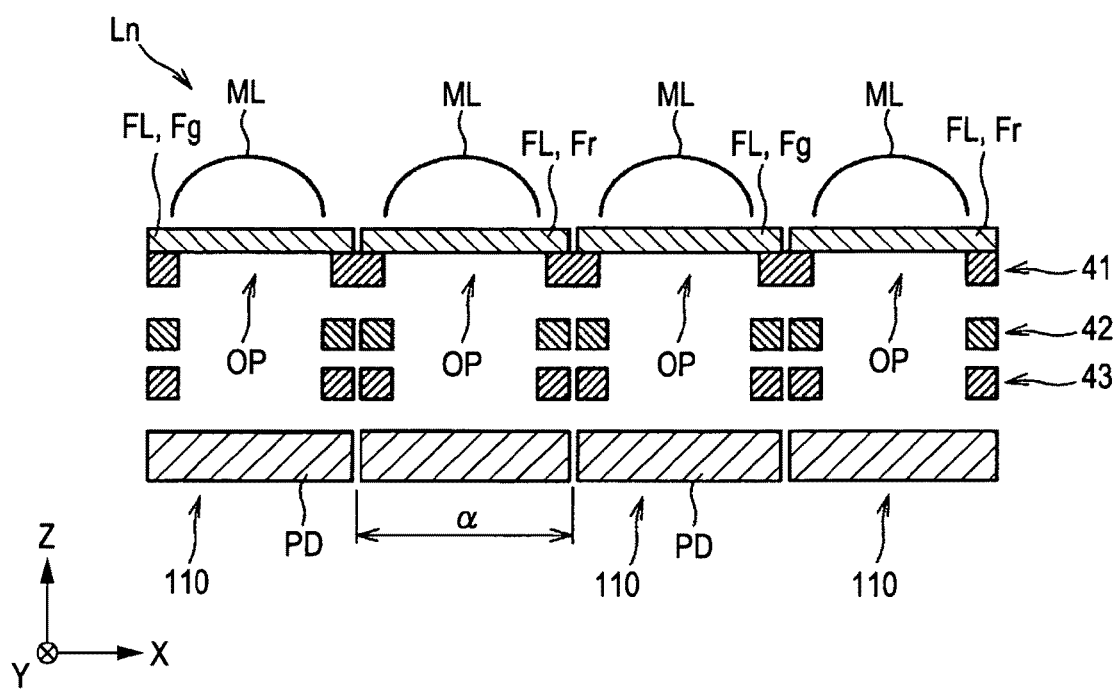
FIG. 7 is a longitudinal sectional view for illustrating the structure of a normal pixel.

FIG. 7 is a longitudinal sectional view for illustrating the structure of the normal pixel 110. The arrangement of the normal pixels 110 depicted in FIG. 7 is provided to, for example, the Gr line L1 of the normal-pixel line Ln (FIG. 6).

In the normal-pixel line Ln, a plurality of photoelectric converting units (photodiodes) PD are arranged in the horizontal direction at a pitch α. As will be described further below, also in the AF line Lf, the plurality of photoelectric converting units PD are arranged in the horizontal direction at the pitch α. Thus, on the imaging plane 101f serving as a light-receiving unit of the image pickup device 101, a plurality of arrangements (horizontal lines), in which the photoelectric converting units PD are arranged adjacently to each other in the horizontal direction at the pitch α, are provided in the vertical direction to form a matrix arrangement of the photoelectric converting unit PD.

In the normal-pixel line Ln, one microlens ML is provided above each of the photoelectric converting units (photodiodes) PD arranged along the horizontal direction at the pitch α. That is, the normal-pixel line Ln includes an arrangement (second photoelectric conversion arrangement) where the photoelectric converting units PD, each being provided thereabove with the microlens ML, are disposed adjacently to each other along the horizontal direction. Between the microlens ML and the photoelectric converting unit PD, a metal layer of three metals is disposed. Specifically, a first metal 41, a second metal 42, and a third metal 43 are disposed sequentially from above. Here, the second metal 42 and the third metal 43 are configured as wirings letting an electric signal pass (in FIG. 7, the wirings are disposed along the vertical direction in the drawing), and the first metal 41 is configured as their ground surface. On this first metal 41, color filters FL are disposed. On each of the color filters FL, the microlens ML is provided. As for the color filters FL, in the arrangement of the normal pixels 110 disposed on the Gr line L1, for example, green filters Fg and red filters Fr are alternately disposed, as depicted in FIG. 7.

Also, in the normal-pixel line Ln, in order to prevent unwanted light passing through each microlens ML from being received by the photoelectric converting unit PD, the spacing between the microlenses ML is light-shielded from each other with the first metal 41. In other words, the first metal 41 functions as a light-shielding mask with an opening OP straight below the microlens ML.

Next, the structure of the AF pixel pair 11*f* is described.

Figure 8:
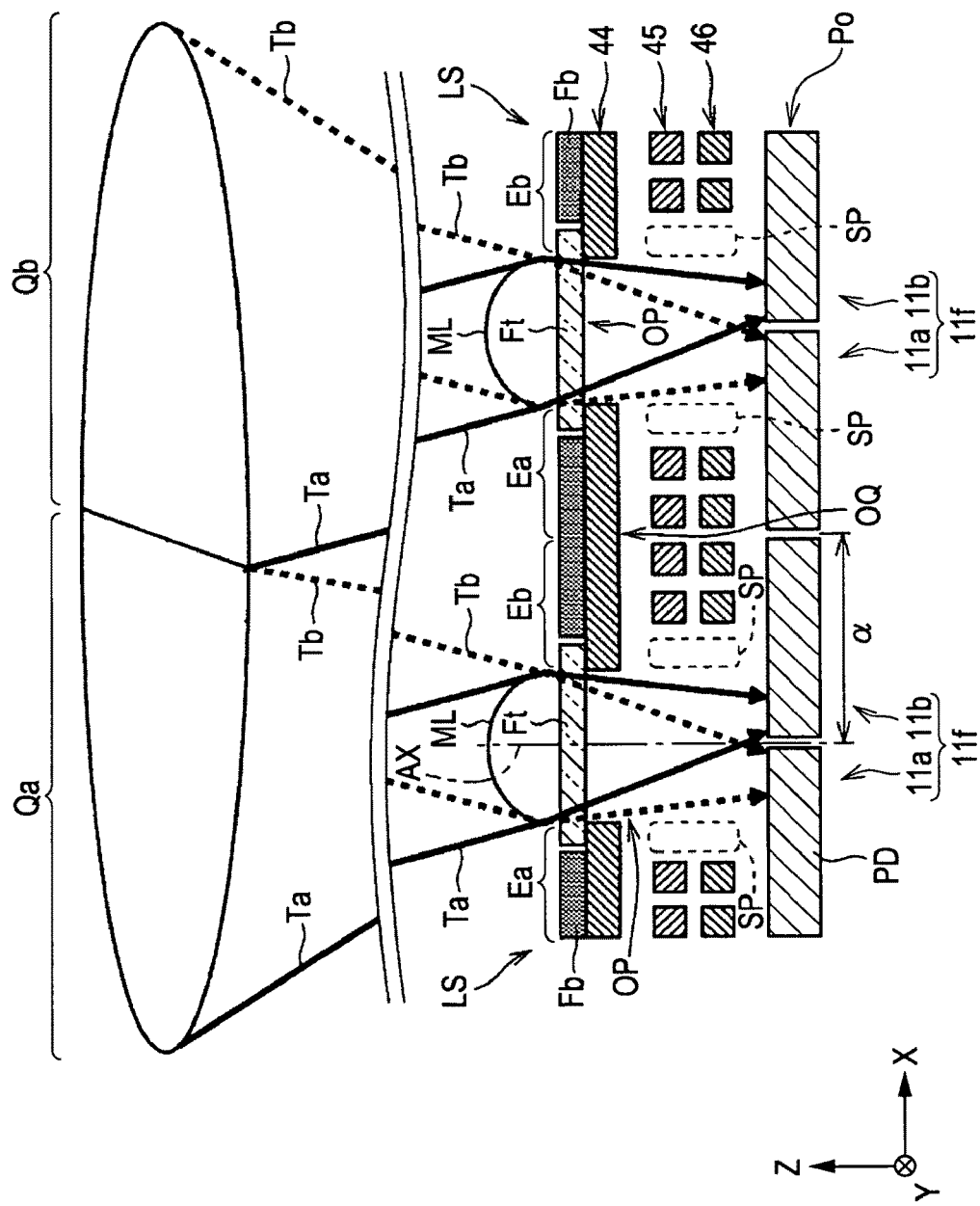
FIG. 8 is a longitudinal sectional view for illustrating the structure of an AF pixel pair.
Figure 9:
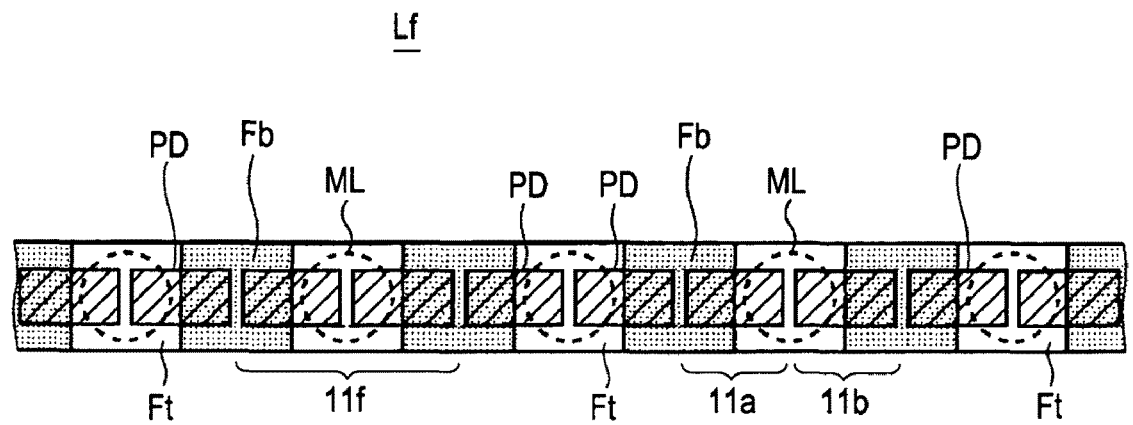
FIG. 9 is a plan view for illustrating the structure of the AF pixel pair.

FIGS. 8 and 9 are a longitudinal sectional view and a plan view, respectively, for illustrating the structure of the AF pixel pair 11*f*. The arrangement of the AF pixel pairs 11*f* depicted in FIGS. 8 and 9 is provided to the AF line Lf (FIG. 6).

The AF pixel pair 11*f* includes a pair of pixels 11*a* and 11*b* in which, as depicted in FIG. 8, the photoelectric converting units PD in a pair are disposed across an optical axis AX of the microlens ML so that a light beam Ta from a left part Qa of the exit pupil of the interchangeable lens 2 and a light beam Tb from a right part Qb thereof are separated from each other (iris division). That is, in the AF pixel pair 11*f*, the photoelectric converting units PD in a pair are disposed so that the optical axis AX of the microlens ML passes through an area interposed therebetween, and the microlens ML is disposed so as to be shifted by a half of the pitch α with respect to the normal-pixel line Ln (also referred to below as half-pitch-shifted arrangement). For differentiation from a positionally-shifted arrangement Pe (refer to FIG. 16), which will be described further below, the arrangement of the AF pixel pair 11*f* depicted in FIG. 8 is referred to as a normalized arrangement Po. In this normalized arrangement Po, it is possible for the photoelectric converting units PD in a pair to receive subject light with approximately the same light amount. Also, the photoelectric converting units PD in a pair each have a size equivalent to the photoelectric converting unit PD of the normal pixel 110 (FIG. 7). By arranging a plurality of pairs of the photoelectric converting units PD adjacently to each other along the horizontal direction at the same pitch α as that of the normal pixels 110, an arrangement of the photoelectric converting units PD (first photoelectric conversion arrangement) in the AF line Lf is formed.

In this AF pixel pair 11*f*, for accurate iris division, a vacant space between the photoelectric converting unit PD of the pixel (also referred to below as the first AF pixel) 11*a* and the photoelectric converting unit PD of the pixel (also referred to below as the second AF pixel) 11*b* is preferably small. Thus, in the image pickup device 101 of the present embodiment having the photoelectric converting unit PD with an elongated shape in the horizontal direction as depicted in FIG. 9, it is appropriate to arrange the AF pixel pairs 11*f* in a longitudinal direction of the photoelectric converting unit PD, that is, in the horizontal direction. Thus, with two or more AF pixel pairs 11*f* arranged along the horizontal direction, the AF line Lf of the present embodiment is formed.

A schematic structure of the AF line Lf with the arrangement of the AF pixel pairs 11*f* is such that, in contrast to the arrangement of the normal pixels 110 depicted in FIG. 7, the members disposed above the photoelectric converting units PD, that is, the first to third metals, the color filters, and the microlenses, are disposed as being shifted by a half pitch in the horizontal direction. That is, the arrangement structure of the photoelectric converting units PD and microlenses ML in the AF line Lf is equivalent to that in which specific microlenses each corresponding to the microlens ML of each AF pixel pair 11*f* among the microlenses ML provided to an upper portion of the arrangement of the photoelectric converting units PD in the normal-pixel line Ln are relatively shifted by a moving amount equivalent to a half of the pitch α in the horizontal direction. With a light-shielding portion LS provided between the specific microlenses ML adjacent to each other in this arrangement structure, the arrangement of the AF pixel pairs 11*f* (AF line Lf) is formed. In this manner, since the AF line Lf can be generated with a slight change of the design of the normal-pixel line Ln, designing and manufacturing of the AF line Lf can be simplified and facilitated. The structure of the light-shielding portion LS provided between the adjacent microlenses ML in the AF line Lf is descried in detail below.

In the AF line Lf, as depicted in FIGS. 8 and 9, every other opening OP (FIG. 7) of the first metal 41 formed in the normal-pixel line Ln is light-shielded by a first metal 44. In other words, in order to bring adjacent AF pixel pairs 11*f* closest to each other to increase accuracy of the phase difference AF, the light-shielding portions LS, each being provided between adjacent microlenses ML in the AF line Lf, are arranged with a space equal to a space of every other pixel in the arrangement of the normal pixels 110 disposed in the horizontal direction in the normal-pixel line Ln. Specifically, a portion OQ (FIG. 8) where the opening OP is formed in the arrangement of the normal pixels 110 depicted in FIG. 7 is blocked by the first metal 44, on which a black color filter (black filter) Fb is disposed every other pixel. The reason for disposing the black filter Fb on the first metal 44 is as follows. That is, if the upper surface of the first metal 44 is exposed, light incident from the interchangeable lens 2 may be reflected to cause a ghost flare. Thus, the black filter Fb is used to absorb this reflected light, thereby suppressing a ghost flare. Therefore, in each AF pixel pair 11*f* of the present embodiment, above the photoelectric converting units PD in a pair, the light-shielding portion LS is disposed, which has two light-shielding areas Ea and Eb made of the first metal 44 and the black filter Fb formed on the portion OQ for light-shielding of light beams of the subject passing through the exit pupil. As such, with light-shielding by the black filter Fb and the first metal (metal layer) 44 in the light-shielding portion LS, appropriate light shielding can be performed in a simple manner. Each AF pixel pair 11*f* is provided with one microlens ML interposed between the two light-shielding areas Ea and Eb extending toward the center from an upper portion of both ends of each of the photoelectric converting units PD in a pair.

Also, in the AF line Lf, a transparent filter Ft is adopted as a color filter provided above the opening OP of the first metal 44. With this, the amount of light received by the AF pixel pair 11*f* can be increased to improve sensitivity.

Furthermore, in the AF line Lf, in order to ensure a large optical path straight below the opening OP of the first metal 44, a second metal 45 and a third metal 46 are separated from the space straight below the opening OP. That is, compared with the structure of the normal pixel 110 depicted in FIG. 7, the second metal 45 and the third metal 46 are disposed deeper by a space SP. This is to prevent the following situation. That is, for example, if the second and third metals are present in the space SP, the actual exit pupil becomes larger than the intended one (in design). In such cases, the light beams from an unintended portion may strike the second and third metals, thereby affecting iris division.

With the above-structured AF pixel pair 11f, iris division in the exit pupil is achieved. That is, light beams Ta from the left part Qa of the exit pupil pass through the microlens ML and the transparent color filter Ft to be received by the photoelectric converting unit PD of the second AF pixel 11b, and also light beams Tb from the right part Qb of the exit pupil pass through the microlens ML and the filter Ft to be received by the photoelectric converting unit PD of the first AF pixel 11a. In other words, the photoelectric converting units PD in a pair in the AF pixel pair 11f receive the light beams Ta and Tb of the subject passing through the partial areas Qa and Qb in a pair (of the left and right parts) of the exit pupil of the interchangeable lens 2 lopsided in reverse to each other along the horizontal direction.

Regarding data for use in phase-difference AF arithmetic (also referred to below as AF data), light-receiving data (data about an electric-charge data) obtained by the first AF pixel 11a is referred to below as A-series data, and light-receiving data obtained by the second AF pixel 11b is referred to below as B-series data. With reference to FIGS. 10 to 14 depicting A-series data and B-series data obtained from a group of AF pixel pairs 11f disposed in one AF line Lf (FIG. 6), for example, the principles of phase-difference AF are described.

Figure 10:
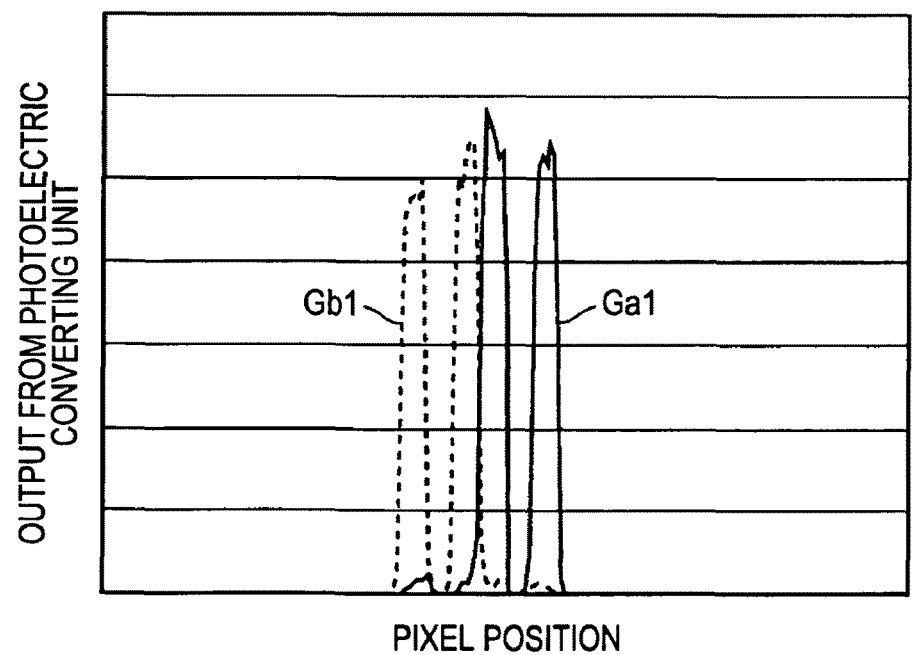
FIG. 10 illustrates a simulation result when a focus plane is defocused from an imaging plane of the image pickup device to a side closer by 200 μm.
Figure 11:
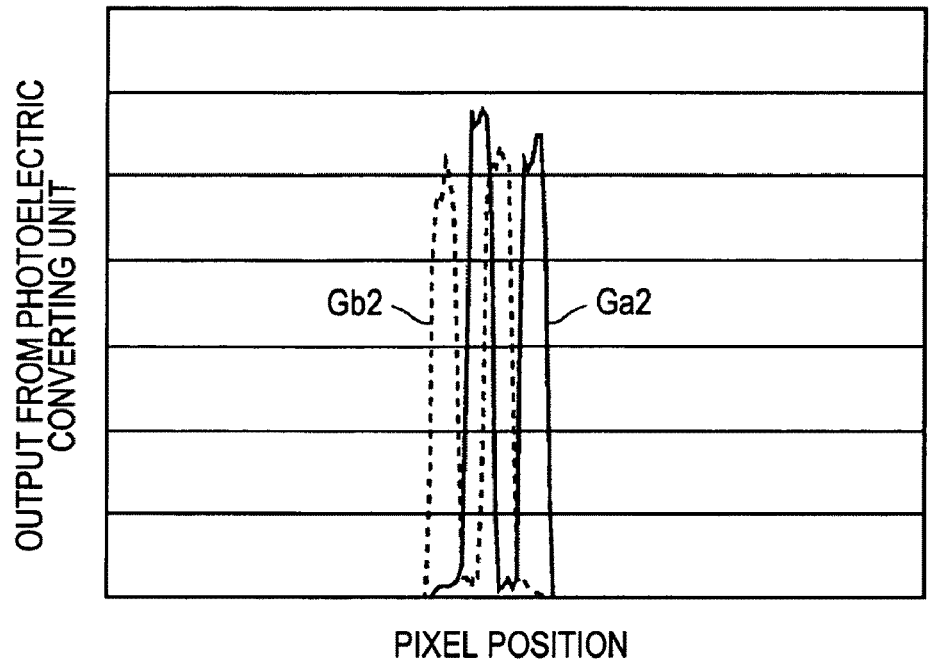
FIG. 11 illustrates a simulation result when the focus plane is defocused from the imaging plane to a side closer by 100 μm.
Figure 12:
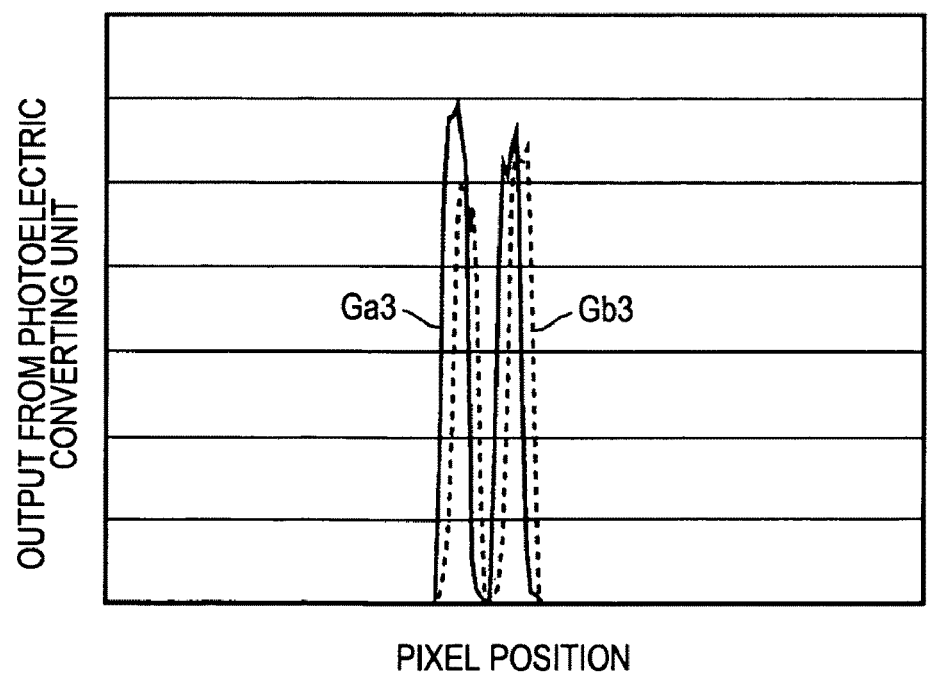
FIG. 12 illustrates a simulation result of a focused state in which the focus plane matches the imaging plane.
Figure 13:
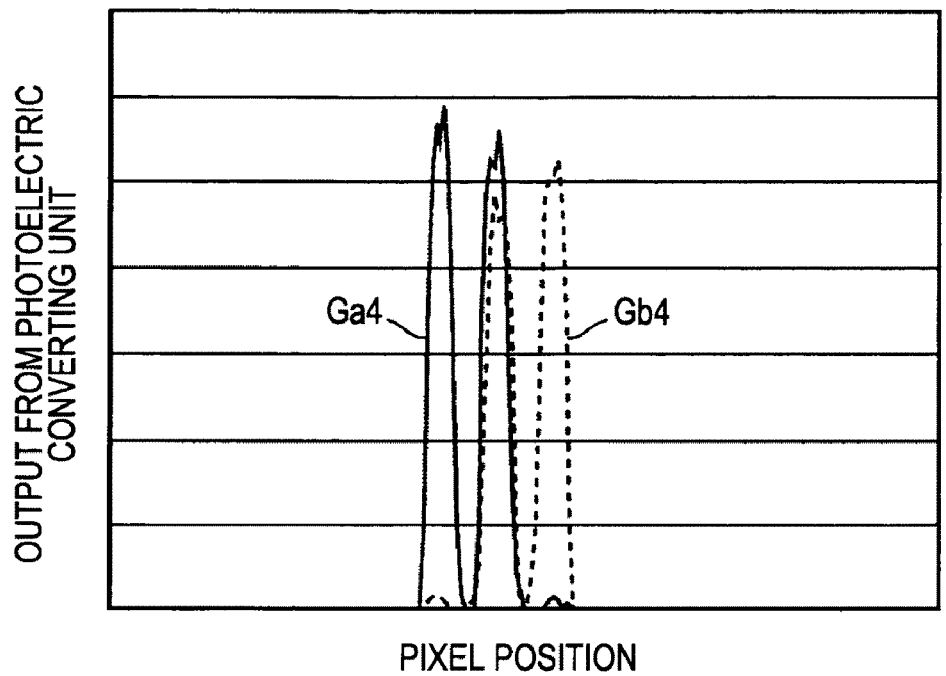
FIG. 13 illustrates a simulation result in which the focus plane is defocused from the imaging plane to a side away by 100 μm.
Figure 14:
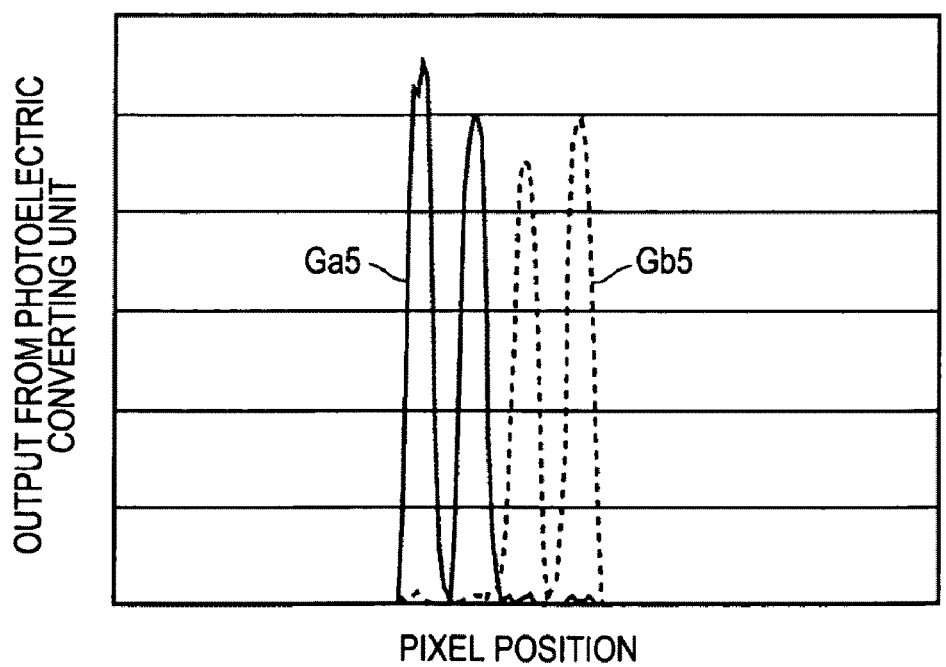
FIG. 14 illustrates a simulation result in which the focus plane is defocused from the imaging plane to a side away by 200 μm.

FIG. 10 illustrates a simulation result when a focus plane is defocused from the imaging plane 101f of the image pickup device 101 to a side closer by 200 μm. FIG. 11 illustrates a simulation result when the focus plane is defocused from the imaging plane 101f to a side closer by 100 μm. FIG. 12 illustrates a simulation result of a focused state in which the focus plane matches the imaging plane 101f. FIG. 13 illustrates a simulation result in which the focus plane is defocused from the imaging plane 101f to a side away by 100 μl. FIG. 14 illustrates a simulation result in which the focus plane is defocused from the imaging plane 101f to a side away by 200 μm. Here, in FIGS. 10 to 14, the horizontal axis represents the pixel positions of the first AF pixel 11a and the second AF pixel 11b with respect to an AF line Lf direction, and the vertical axis represents outputs from the photoelectric converting units PD of the first AF pixel 11a and the second AF pixel 11b. Also, in FIGS. 10 to 14, graph lines Ga1 to Ga5 (indicated by solid lines) represent A-series data, and graph lines Gb1 to Gb5 (indicated by broken lines) represent B-series data.

In FIGS. 10 to 14, in comparison between A-series image columns represented by the A-series graph lines Ga1 to Ga5 and B-series image columns represented by the B-series graph lines Gb1 to Gb5, it can be found that, as the defocus amount is larger, the shift amount (deviated amount) in the direction of AF line LF (horizontal direction) occurring between the A-series image column and the B-series image column is increased.

Figure 15:
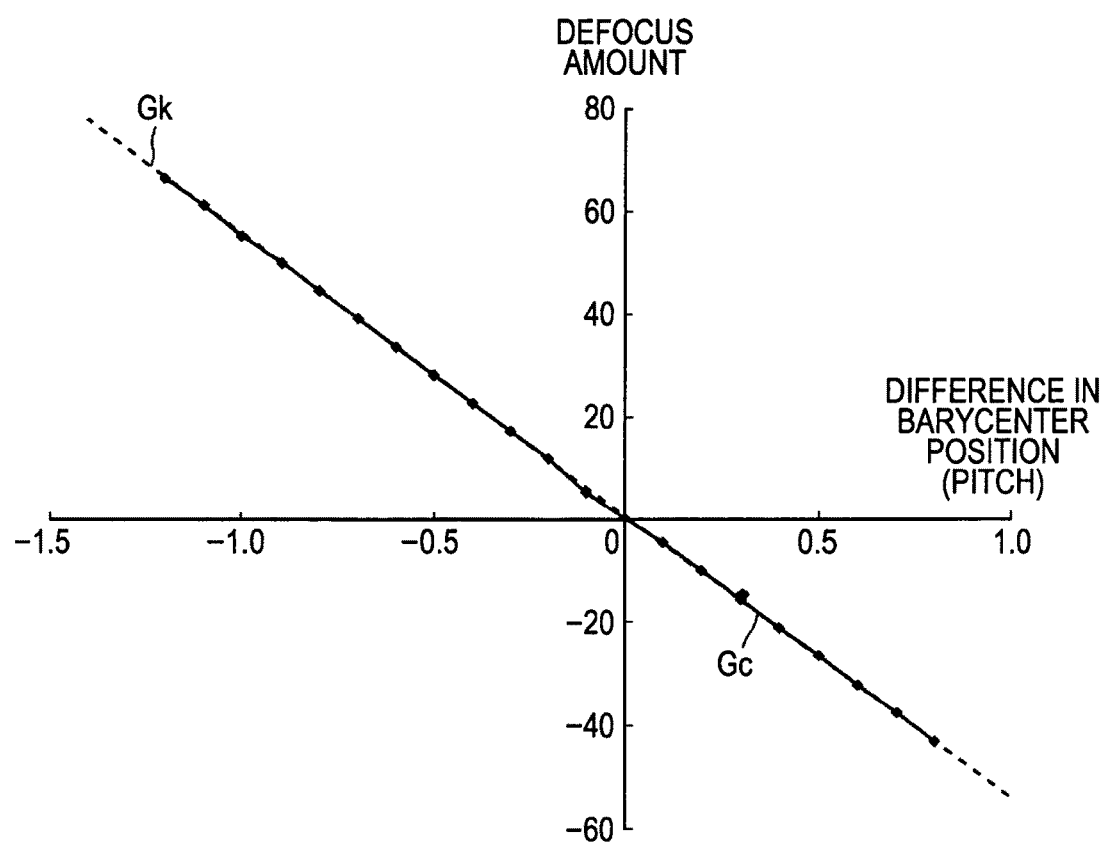
FIG. 15 is a graph depicting a relation between a difference in barycenter position and a defocus amount in a pair of image strings.

When a relation between the shift amount in a pair of image columns (A-series and B-series image columns) and the defocus amount is plotted on a graph, a graph line Gc appears as depicted in FIG. 15. In FIG. 15, the horizontal axis represents a difference (pixel pitch) in the barycenter position of the B-series image column from the barycenter position of the A-series image column, and the vertical axis represents a defocus amount (μm). Here, a barycenter position Xg of each image column can be found by, for example, Equation 1 below.

[Equation 1]

$$X_g = \frac{X_1Y_1 + X_2Y_2 + \ldots + X_nY_n}{Y_1 + Y_2 + \ldots + Y_n} \quad (1)$$

In the above Equation 1, X1 to Xn represent pixel positions from the left end of the AF line Lf, for example, and Y1 to Yn represent output values at the respective positions X1 to Xn from the first AF pixel 11a and the second AF pixel 11b.

As evident from the graph line Gc depicted in FIG. 15, the relation between the difference in barycenter position between image columns in a pair and the defocus amount is proportional. This proportional relation can be represented by Equation 2 below, where the defocus amount is represented by DF (μm) and the difference in barycenter position is represented by C (μm).

[Equation 2]

$$DF = k \times C \quad (2)$$

Here, a coefficient k in Equation 2 represents a gradient Gk (indicated by a broken line in the drawing) of the line Gc in FIG. 15, and can be obtained in advance through a factory test or the like.

From the above, after the difference (phase difference) in barycenter position between the A-series data and the B-series data obtained from the AF pixel pair 11f in the AF line Lf is found by the phase-difference AF arithmetic circuit 77, a defocus amount can be calculated by using Equation 2 above. Then, by giving the focus lens 211a driving amount equivalent to the calculated defocus amount, auto focus (AF) control of moving the focus lens 211 to the detected focus position can be made. Here, the relation between the defocus amount and the driving amount of the focus lens 211 is uniquely defined with a setting value of the interchangeable lens 2 mounted on the camera body 10.

In the imaging device 1 that performs a phase-difference AF operation as described above, the image pickup device (image pickup device with a phase-difference detecting function) 101 has the AF lines Lf each having the structure in which the members above the photoelectric converting units PD in the arrangement of the normal pixels 110 depicted in FIG. 7 are shifted by a half pitch in the horizontal direction and the light-shielding portion LS (FIG. 8) is provided every other pixel. As a result, in the image pickup device 101, focus detection of the phase-difference detecting technique can be accurately performed. In addition, excellent manufacturing is possible even when microfabrication of pixels advances. Also, compared with the type of the image pickup device with a phase-difference detection function disclosed in Japanese Unexamined Patent Application Publication No. 2005-303409 in which the light beams of the subject are restricted with a small opening of a light-shielding mask for iris division, necessary light beams can be prevented from being cut, thereby suppressing a decrease in sensitivity in the photoelectric converting unit.

As described above, in the imaging device 1, based on the A-series and B-series data obtained from the arrangement of the photoelectric converting units PD disposed on the AF line Lf after exposure of the image pickup device 101, a phase-difference AF arithmetic is done by the phase-difference AF arithmetic circuit 77, thereby performing an AF operation. However, when the AF pixel pair 11f is positionally shifted from the normalized arrangement Po (FIG. 8) due to an error of manufacturing (positionally-shifted arrangement), an accurate phase-difference AF arithmetic is difficult. The present embodiment is configured to allow an appropriate phase-difference AF arithmetic even in the case of such a positionally-shifted arrangement, which will be described in detail below.

[Phase-Difference AF Arithmetic in Positionally-Shifted Arrangement]

Figure 16:
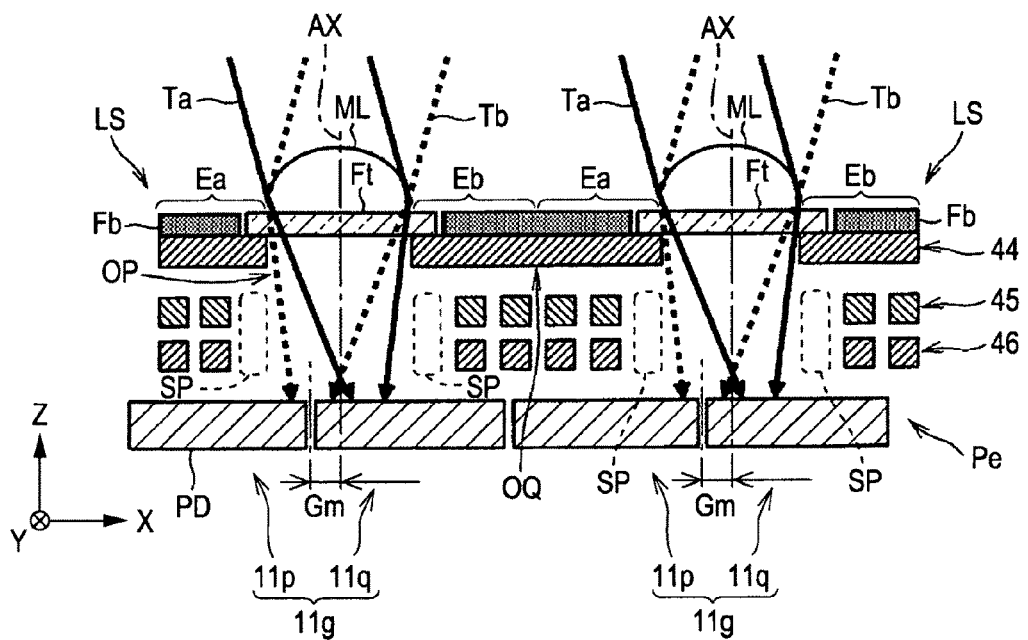
FIG. 16 is a longitudinal sectional view for illustrating the structure of an AF pixel pair in a positionally-shifted arrangement.

FIG. 16 is a longitudinal sectional view for illustrating the structure of an AF pixel pair 11g in positionally-shifted arrangement.

In contrast to the AF pixel pairs 11f in the normalized arrangement Po depicted in FIG. 8, the AF pixel pairs 11g are in an arrangement (positionally-shifted arrangement) Pe, in which the first to third metals 44 to 46, the color filters Ft, and the microlenses ML disposed above the photoelectric converting units PD are positionally shifted to a right direction (+X direction) by a shift amount Gm.

In general, when an image pickup device with AF pixel pairs is manufactured, it is difficult to reliably (with a probability of 100%) achieve the normalized arrangement Po of the AF pixel pairs 11f due to an error in device formation on a semiconductor wafer. In some cases, the positionally-shifted arrangement Pe may occur with a different shift amount Gm for each lot.

In the AF pixel pair 11g with a relative positional shift due to an error of manufacturing the image pickup device 101 from the normalized arrangement Po (FIG. 8) in which light beams of the subject are received by the photoelectric converting units PD in a pair in the AF pixel pairs with the same light-receiving balance, the light-receiving amount is unbalanced between a first AF pixel 11p and a second AF pixel 11q, which will be described with reference to FIG. 17.

Figure 17:
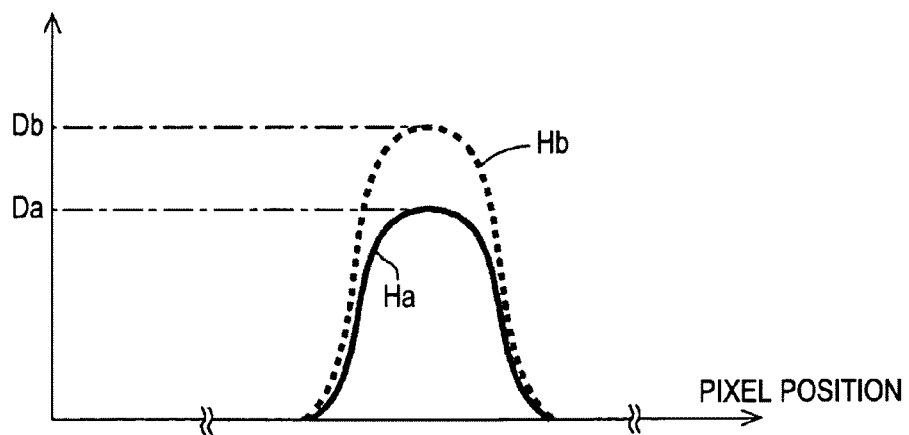
FIG. 17 is a conceptual diagram for illustrating AF data obtained at a positionally-shifted AF pixel pair in a focused state.

FIG. 17 is a conceptual diagram for illustrating AF data obtained at the positionally-shifted AF pixel pair 11g in a focused state. In this FIG. 17, the horizontal axis represents pixel positions of the first AF pixel 11p and the second AF pixel 11q in an AF line LF direction, and the vertical axis represents outputs from the photoelectric converting unit PD of the first AF pixel 11p and the second AF pixel 11q. Also, in FIG. 17, a graph line Ha (indicated by a solid line in the drawing) represents A-series data, and a graph line Hb (indicated by a broken line in the drawing) represents B-series data.

Figure 18:
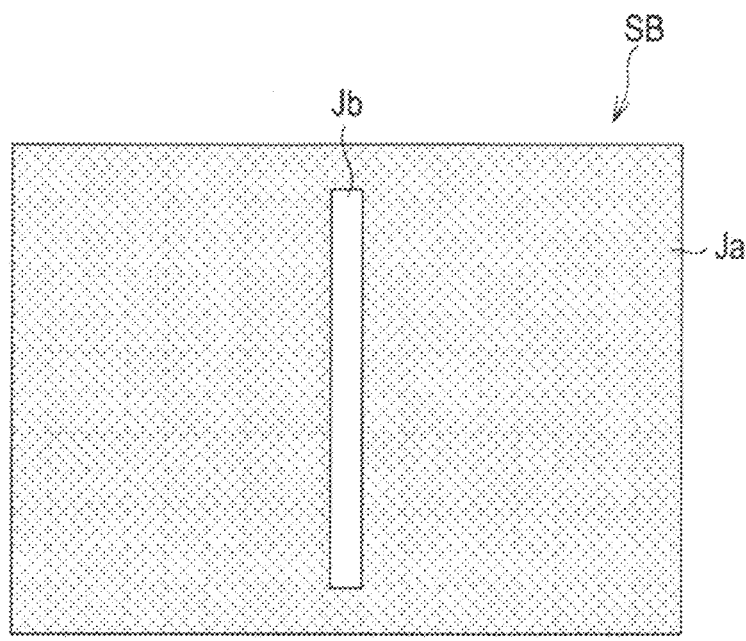
FIG. 18 illustrates a slit subject.

The graph lines Ha and Hb depicted in FIG. 17 represent A-series and B-series data, respectively, obtained by the image pickup device 101 with a plurality of AF pixel pairs 11g capturing an image of a slit subject SB in which, for example, as depicted in FIG. 18, a white portion Jb in a white line shape extending in a vertical direction is formed on a black background Ja (represented by halftone in the drawing). Here, the AF pixel pairs 11g are in the positionally-shifted arrangement Pe in which the optical axis AX of each microlens ML passes through the photoelectric converting unit PD of the second AF pixel 11q as depicted in FIG. 16. Therefore, the light-receiving amount of the first AF pixel 11p is smaller than that of the second AF pixel 11q. For this reason, the graph line Ha takes a shape of the graph line Hb compressed in the vertical direction, and its compression ratio has a value obtained by dividing a peak value Da of the graph line Ha by a peak value Db of the graph line Hb.

As described above, an unbalance occurs between the A-series data and the B-series data obtained in the AF pixel pair 11g. However, if this unbalance amount is recognized in advance and AF data obtained in the AF pixel pair 11g is corrected based on the recognition, balanced A-series and B-series data can be generated.

Specifically, an image of the slit subject SB depicted in FIG. 18 is captured through a factory test or the like and, based on an electric charge signal of the AF pixel pair 11g generated at this capturing, A-series data and B-series data as depicted in FIG. 17 are obtained. Then, for example, by dividing the peak value Da (FIG. 17) regarding the A-series data by the peak value Db (FIG. 17) regarding the B-series data, a ratio of the A-series data with respect to the B-series data is found. Then, a correction value $\beta$ (=Db/Da), which is an inverse of this ratio, is stored in the ROM 621 of the main control unit 62. As the shift amount Gm in the positionally-shifted arrangement Pe is larger, an unbalance is larger between the A-series data and the B-series data obtained from the AF pixel pair 11g. Therefore, the correction value $\beta$ becomes corresponding to the shift amount Gm from the normalized arrangement Po (FIG. 8).

Figure 19:
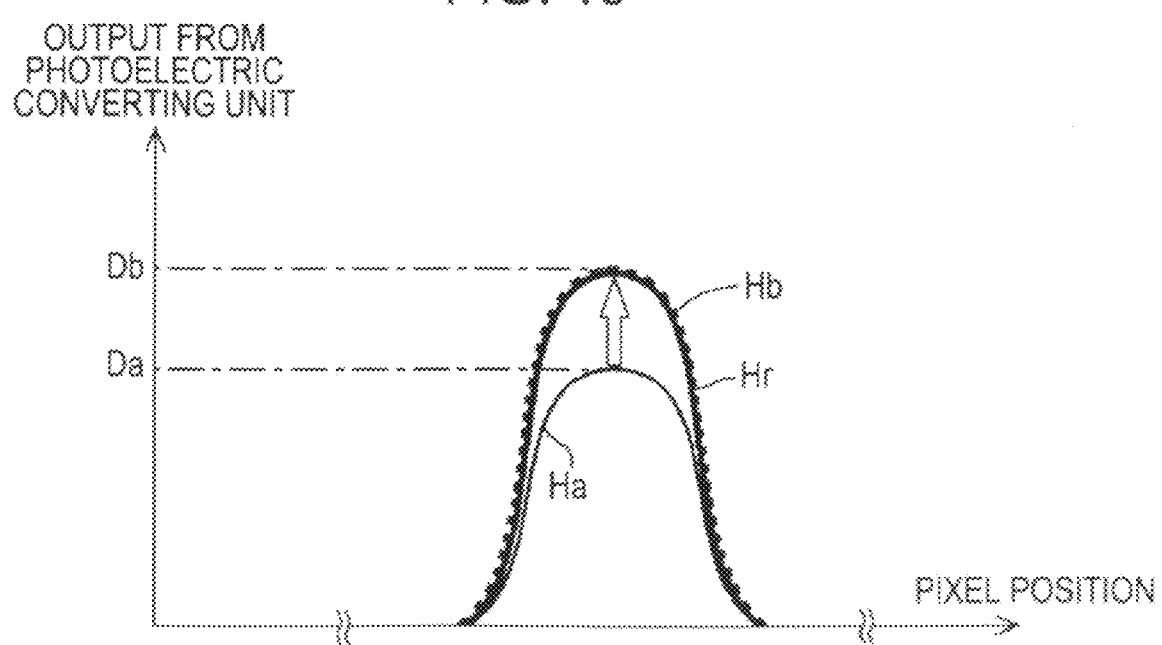
FIG. 19 illustrates correction of AF data.

After the correction amount $\beta$ is stored in the ROM 621, even when the unbalanced A-series and B-series data is output from the AF pixel pair 11g, a correcting process of multiplying the A-series data by the correction value $\beta$ in the ROM 621 is performed. Then, as depicted in FIG. 19, the original graph line Ha (before correction) regarding the A-series data is expanded in the vertical direction to generate a graph line Hr after correction corresponding to the graph line Hb regarding the B-series data. With this, an unbalance between the A-series data and the B-series data can be solved, thereby allowing accurate phase-difference AF arithmetic.

The correcting process at the AF pixel pair 11g described above is described in detail below with reference to FIG. 20.

Figure 20:
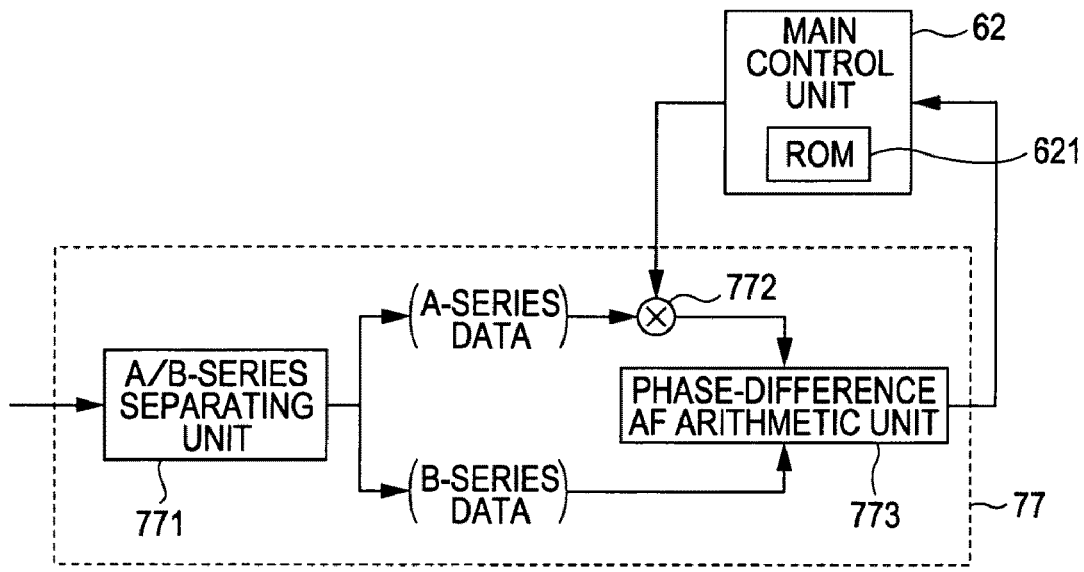
FIG. 20 is a block diagram for illustrating a functional structure of a phase-difference AF arithmetic circuit.

FIG. 20 is a block diagram for illustrating a functional structure of the phase-difference AF arithmetic circuit 77.

The phase-difference AF arithmetic circuit 77 includes an A/B-series separating unit 771 that separates AF data obtained from the AF line Lf into A-series data and B-series data, a multiplier 772, and a phase-difference AF arithmetic unit 773 that performs a phase-difference AF arithmetic according to the A-series data and the B-series data.

In the above-structured phase-difference AF arithmetic circuit 77, AF data output from the black-level correction circuit 611 (FIG. 4) is first separated by the A/B-series separating unit 771 into A-series data and B-series data. Next, the multiplier 772 multiplies the A-series data output from the A/B-series separating unit 771 by the correction value $\beta$ stored in the ROM 621 of the main control unit 62 to generate the corrected A-series data as represented by the graph line Hr depicted in FIG. 19. Then, based on this corrected A-series data and the B-series data output from the A/B-series separating unit 771, the phase-difference AF arithmetic described above is performed by the phase-difference AF arithmetic unit 773, thereby allowing accurate phase-difference AF.

In this imaging device 1, in the AF pixel pair 11g in which the photoelectric converting units PD in a pair are relatively and positionally shifted from the normalized arrangement (normalized position) Po (FIG. 8) as depicted in FIG. 16, the A-series and B-series data obtained from the photoelectric converting units PD in a pair are corrected with the correction value (correction amount) $\beta$ corresponding to the shift amount Gm. Then, based on the corrected data, phase-difference AF is performed. With this, even when a positional shift occurs in the image pickup device (image pickup device with a phase-difference detecting function) 101 due to an error of manufacturing, focus detection of the phase-difference detecting technique can be accurately performed.

Here, in the imaging device 1, an image of the slit subject SB as depicted in FIG. 18 may not be captured to obtain the correction value $\beta$. For example, an image of a subject in only a single color of white, such as white paper sheet (also abbreviated below as the white subject), may be captured to obtain the correction value β. A technique of obtaining the correction value β with such a white subject is briefly described below.

Figure 21:
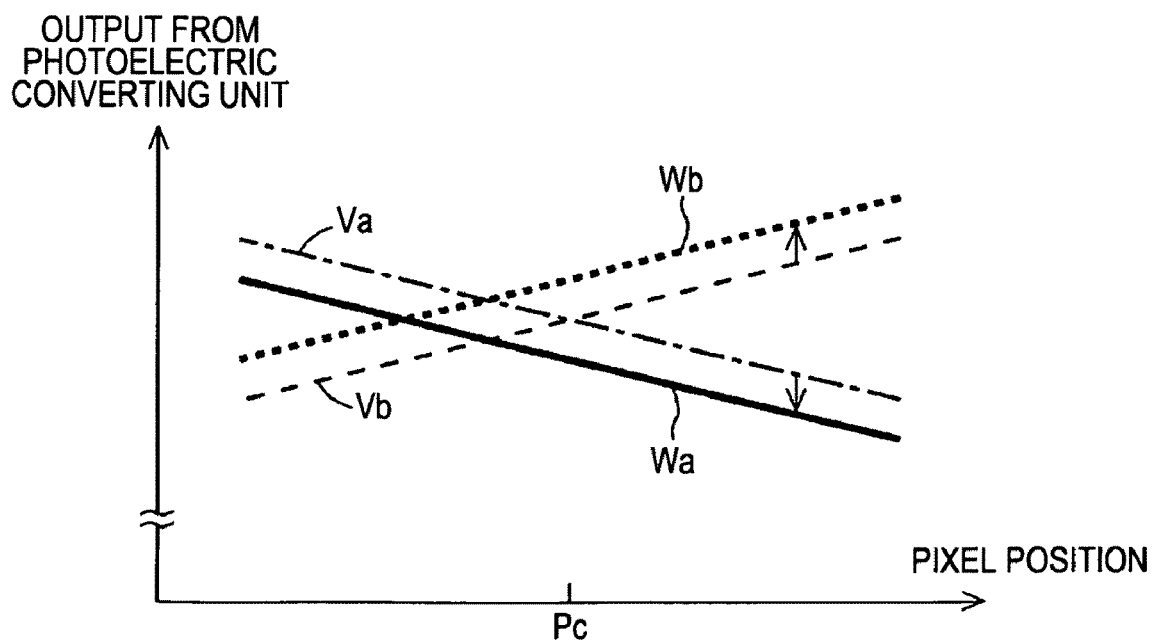
FIG. 21 is a conceptual diagram qualitatively depicting AF data obtained from the positionally-shifted AF pixel pair when an image of a white subject is captured.

FIG. 21 is a conceptual diagram qualitatively depicting AF data obtained from the positionally-shifted AF pixel pair 11g when an image of a white subject is captured. In FIG. 21, the horizontal axis represents a pixel position of each of the first and second AF pixels in the AF line Lf direction, and the vertical axis represents an output from the photoelectric converting unit PD of each of the first and second AF pixels. Also, in FIG. 21, graph lines Va and Vb represent A-series data and B-series data, respectively, obtained at the AF pixel pair 11f (FIG. 8) in the normalized arrangement Po, and graph lines Wa and Wb represent A-series data and B-series data, respectively, obtained at the AF pixel pair 11g (FIG. 16) in the positionally-shifted arrangement Pe.

The graph lines Va and Vb representing the AF data obtained at the AF pixel pair 11f in the normalized arrangement Po cross at an intermediate point Pc in the AF line Lf, and has a tendency such that the gradient of the subject light increases at AF pixel pairs away from the intermediate point Pc. Therefore, the image height is higher, the A-series data and the B-series data are unbalanced more.

From the AF pixel pairs 11g in the positionally-shifted arrangement Pe, A-series data represented by the graph line Wa obtained by totally shifting the graph line Va down and B-series data represented by the graph line Wb obtained by totally shifting the graph line Vb up are obtained.

Therefore, when an average value of the A-series data represented by the graph line Wa and an average value of the B-series data represented by the graph line Wb are found and a correction value β is derived based on a ratio between these average values, an appropriate correction value β can be obtained when an image of a white subject is captured.

Modification Example

In the image pickup device of the above-described embodiment, the AF lines Lf configured as depicted in FIG. 6 may not be provided. For example, typical AF horizontal lines may be provided in which photoelectric converting units in a pair disclosed in Japanese Unexamined Patent Application Publications Nos. 2001-250931 and 2005-303409 are arranged in the horizontal direction. Even in these typical AF lines, when a positional shift occurs due to an error of manufacturing to produce an unbalance output from the photoelectric converting unit in a pair, the above-described correction by using the correction value β can be made, thereby allowing an accurate phase-difference AF arithmetic.

Figure 22:
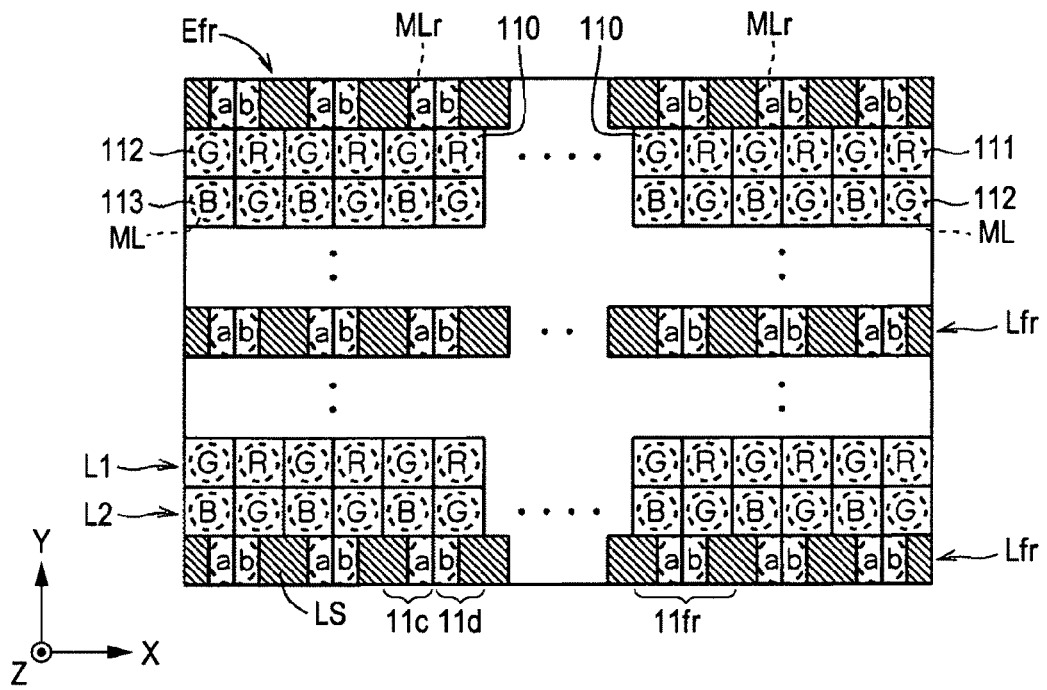
FIG. 22 illustrates the structure of an AF area according to a modification example of the present invention.
Figure 23:
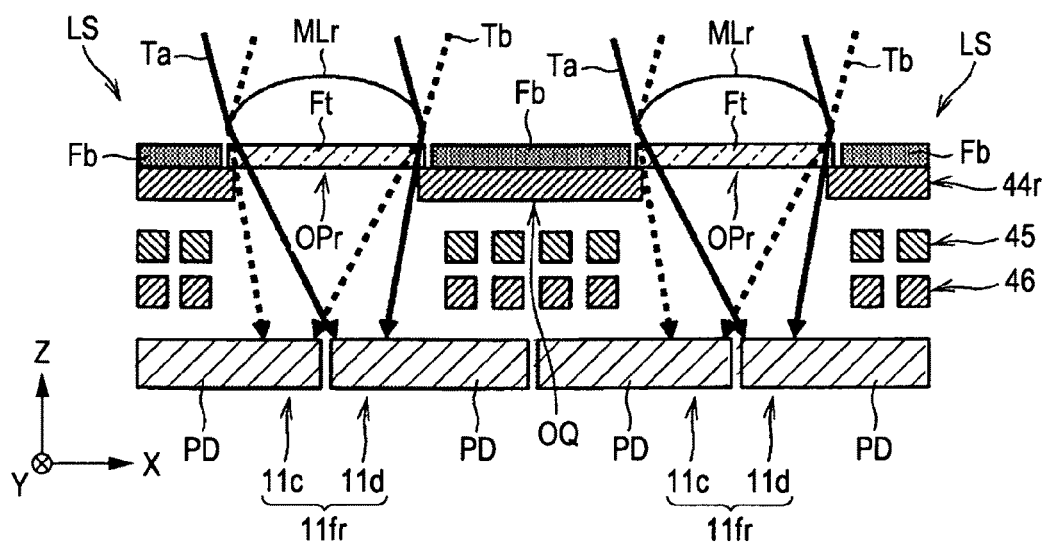
FIG. 23 is a longitudinal sectional view depicting the structure of the AF pixel pair in the AF area in FIG. 22.

In the above-described embodiment, the AF area Ef having the AF lines Lf with the microlenses ML identical in structure to those of the normal pixels 110 as depicted in FIG. 6 may not be adopted. As depicted in FIGS. 22 and 23, an AF area Efr having AF lines Lfr with microlenses MLr having a diameter larger than that of the normal pixels 110 may be adopted. In this case, an opening of a first metal 44r in accordance with the diameter of the microlens MLr, specifically, an opening OPr slightly larger than the opening OP depicted in FIG. 8, is formed. With these microlenses MLr (and the opening OPr of the first metal 44r), sensitivity of AF pixel pairs 11fr can be increased. The same goes for the AF pixel pairs 11g in the positionally-shifted arrangement Pe.

Figure 24:
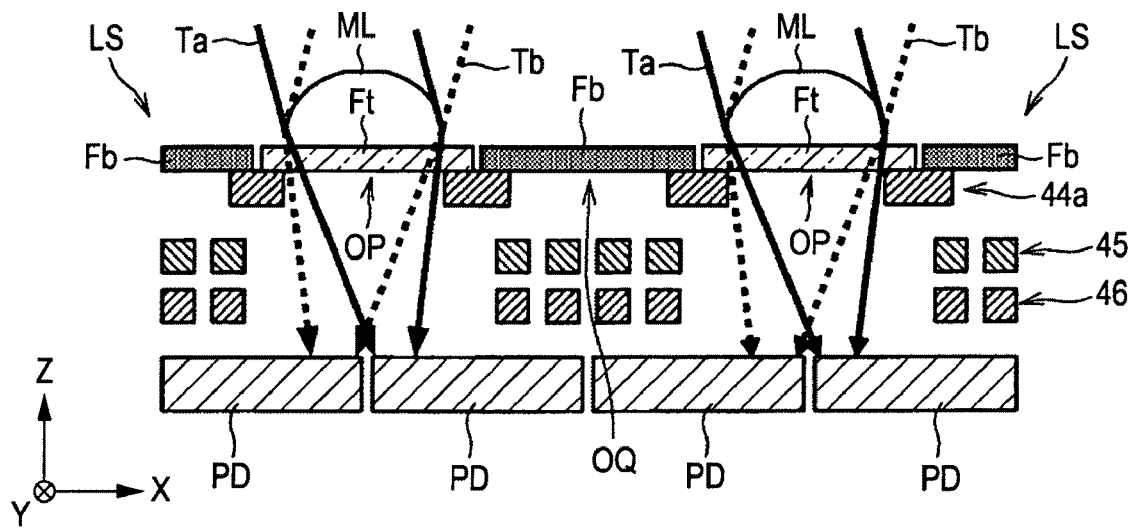
FIG. 24 illustrates the structure of a first metal according to the modification example of the present invention.

As for the AF pixel pairs of the above-described embodiment, the first metal 44 with the blocked portion OQ straight below the black filter Fb as depicted in FIG. 8 may not be adopted. As depicted in FIG. 24, a first metal 44a with the opening OP formed straight below the black filter Fb may be adopted. In this case, in order to suppress reception of light passing through the black filter Fb by the photoelectric converting units PD immediately below the filter, the black filter Fb for use preferably has a low transmittance (for example, 3% or lower). In this manner, if the opening OP is formed straight below the black filter Fb, the opening OP can be provided to the first metal at the same pitch as that of the arrangement of the normal pixels 110 also in the AF line Lf, thereby also using the design of the first metal in the normal pixels 110. In a structured as depicted in FIG. 8, the black filter Fb may be omitted. In this case, as described above, the first metal is exposed to cause a concern of a ghost flare. However, this can be suppressed by, for example, coloring the upper surface of the first metal with black or adopting a conductive layer formed of a black conductive material as a first metal. The same goes for the AF pixel pairs 11g in the positionally-shifted arrangement Pe.

Figure 25:
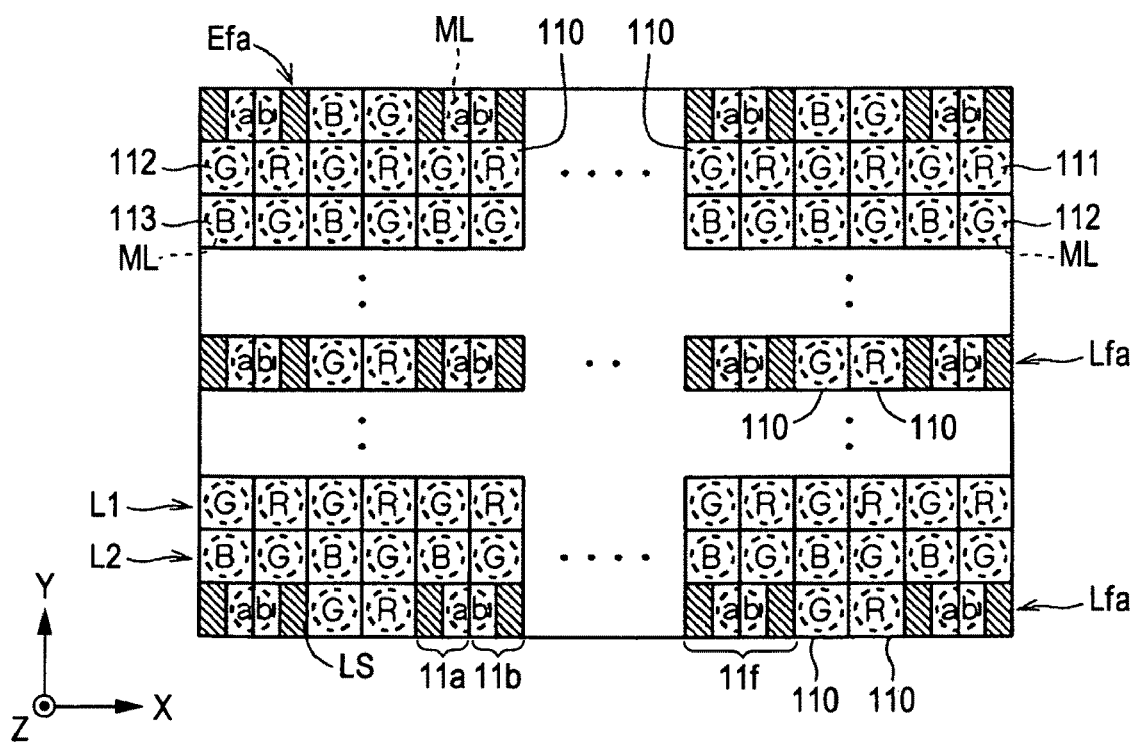
FIG. 25 illustrates the structure of the AF area according to the modification example of the present invention.

As for the image pickup device of the above-described embodiment, the AF area Ef having the AF lines Lf only with the AF pixel pairs 11f as depicted in FIG. 6 may not be adopted. As depicted in FIG. 25, an AF area Efa having AF lines Lfa in which the normal pixels 110 are interposed between the AF pixel pairs 11f may be adopted. In this case, missing image information about the subject in the AF pixel pairs 11f can be complemented by using the image information of the normal pixels 110 interposed in the AF line Lfa, thereby enhancing image quality.

In the above-described embodiment, the AF line provided with every other opening OP of the first metal 41 formed in the normal-pixel line Ln may not be adopted. Alternatively, an AF line provided with every two, three, or more openings OP may be adopted.

As for the AF pixel pairs 11f in the AF line Lf according to the above-described embodiment, the members (microlenses or color filters) above the photoelectric converting units PD may not be shifted by a half pitch from the normal-pixel line Ln. Alternatively, with the members above the photoelectric converting units PD being as they are, the photoelectric converting units PD may be shifted by a half pitch with respect to the horizontal line of the normal pixels 110.

In the above-described embodiment, the image pickup device 101 including the AF lines Lf may not be provided to a digital camera of a single-lens reflex type, but may be provided to a digital camera of a compact type.

As for the AF pixel pairs in the above-described embodiment, a transparent color filter may not be provided to each opening OP of the first metal 44. Alternatively, a green color filter excellent in visibility characteristics may be provided in view of placing importance on accuracy in focusing, or a red or blue color filter may be provided.

In the above-described embodiment, the microlenses may be placed on the black filter Fb. With the microlenses placed in this manner, the microlenses can be disposed at a pitch similar to that of the arrangement of the normal pixels 110, and the arrangement design of the microlenses in the normal pixels 110 can also be used.

This completes the description of the present invention; the above description is just an example, and is not meant to restrict the present invention. It is understood that an unlimited number of modification examples not exemplarily mentioned herein can be assumed without deviating from the scope of the present invention.

What is claimed is:
1. An imaging device comprising:
an image pickup device having an arrangement of photoelectric converting units, the arrangement in which a plurality of pairs of photoelectric converting units are arranged along a predetermined direction, each pair of photoelectric converting units receiving light beams of a subject passing through an exit pupil of a shooting optical system, wherein each photoelectric converting unit in the same pair of photoelectric converting units receives the light beams passing through a different portion of the exit pupil than the other photoelectric converting unit in the same pair of photoelectric converting units; and focus detecting means for performing focus detection of a phase-difference detecting technique according to data obtained from the pair of photoelectric converting units in the arrangement of the photoelectric converting units;

wherein due to an error in manufacturing the image pickup device, a relative positional shift occurs from a normalized position where the light beams of the subject are received by the pair of photoelectric converting units with a predetermined light-receiving balance, and wherein the focus detecting means includes:

correcting means for correcting the data according to a correction amount corresponding to a positional shift amount from the normalized position, and means for performing focus detection of the phase-difference detecting technique according to the data corrected by the correcting means.

2. The imaging device according to claim 1, further comprising, above the pairs of the photoelectric converting units at the normalized position, a light-shielding unit having two light-shielding areas that shield the light beams passing through the exit pupil and one microlens interposed between the two light-shielding areas.

3. The imaging device according to claim 2, wherein the pairs of the photoelectric converting units at the normalized position are disposed so that an optical axis of the one microlens passes through an area interposed between the pairs of the photoelectric converting units.

4. The imaging device according to claim 2, wherein:

the image pickup device has a light-receiving unit in which a matrix arrangement of the photoelectric converting units is formed;

the matrix arrangement of the photoelectric converting units includes:

a first photoelectric conversion arrangement in which the pairs of photoelectric converting units are arranged adjacently to each other in the predetermined direction, and a second photoelectric conversion arrangement in which a plurality of other photoelectric converting units, each being provided with a microlens thereabove, are arranged adjacently to each other in the predetermined direction; and an arrangement relation between the first photoelectric conversion arrangement and the one microlens corresponds to an arrangement structure when a predetermined microlens among microlenses provided to an upper portion of the second photoelectric conversion arrangement is relatively shifted by a predetermined amount in the predetermined direction.

5. A focus detecting method comprising the steps of:

exposing an image pickup device having an arrangement of photoelectric converting units, the arrangement in which a plurality of pairs of photoelectric converting units are arranged along a predetermined direction, each pair of photoelectric converting units receiving light beams of a subject passing through an exit pupil of a shooting optical system, wherein each photoelectric converting unit in the same pair of photoelectric converting units receives the light beams passing through a different portion of the exit pupil than the other photoelectric converting unit in the same pair of photoelectric converting units; and performing focus detection of a phase-difference detecting technique according to data obtained from the pair of photoelectric converting units after the exposure at the exposing step in the arrangement of the photoelectric converting units;

wherein due to an error in manufacturing the image pickup device, a relative positional shift occurs from a normalized position where the light beams of the subject are received by the pair of photoelectric converting units with a predetermined light-receiving balance, and wherein the focus detecting step includes the steps of:

correcting the data according to a correction amount corresponding to a positional shift amount from the normalized position, and performing focus detection of the phase-difference detecting technique according to the data corrected in the correcting step.

6. An imaging device comprising:

an image pickup device having an arrangement of photoelectric converting units, the arrangement in which a plurality of pairs of photoelectric converting units are arranged along a predetermined direction, each pair of photoelectric converting units receiving light beams of a subject passing through an exit pupil of a shooting optical system, wherein each photoelectric converting unit in the same pair of photoelectric converting units receives the light beams passing through a different portion of the exit pupil than the other photoelectric converting unit in the same pair of photoelectric converting units; and a focus detector performing focus detection of a phase-difference detecting technique according to data obtained from the pair of photoelectric converting units in the arrangement of the photoelectric converting units;

wherein due to an error in manufacturing the image pickup device, a relative positional shift occurs from a normalized position where the light beams of the subject are received by the pair of photoelectric converting units with a predetermined light-receiving balance, and wherein the focus detector includes:

a corrector correcting the data according to a correction amount corresponding to a positional shift amount from the normalized position, and a focus detector performing focus detection of the phase-difference detecting technique according to the data corrected by the corrector.

* * * * *